US008953561B2

(12) United States Patent (10) Patent No.: US 8,953,561 B2
Nishida et al. (45) Date of Patent: Feb. 10, 2015

(54) MOBILE COMMUNICATION METHOD

(75) Inventors: Katsutoshi Nishida, Tokyo (JP);
Toshiyuki Tamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 3 days.

(21) Appl. No.: 13/807,369

(22) PCT Filed: Jun. 28, 2011

(86) PCT No.: PCT/JP2011/064814
§ 371 (c)(1),
(2), (4) Date: Apr. 12, 2013

(87) PCT Pub. No.: WO2012/002392
PCT Pub. Date: Jan. 5, 2012

(65) Prior Publication Data
US 2013/0188603 A1 Jul. 25, 2013

(30) Foreign Application Priority Data

Jun. 30, 2010 (JP) ................................. 2010-150560
Jul. 5, 2010 (JP) ................................. 2010-153469

(51) Int. Cl.
*H04W 4/00* (2009.01)
*H04W 40/36* (2009.01)
(Continued)

(52) U.S. Cl.
CPC .......... *H04W 40/36* (2013.01); *H04W 36/0022* (2013.01); *H04M 7/123* (2013.01)
USPC ............................................................. 370/331

(58) Field of Classification Search
USPC ........................... 370/329, 331, 351; 455/436
See application file for complete search history.

(56) References Cited

U.S. PATENT DOCUMENTS

2006/0217112 A1* 9/2006 Mo ............................ 455/422.1
2006/0234709 A1* 10/2006 Marinescu et al. ........... 455/436
(Continued)

FOREIGN PATENT DOCUMENTS

JP 2008-535352 A 8/2008
WO 2006/103547 A1 10/2006
(Continued)

OTHER PUBLICATIONS

International Search Report issued in PCT/JP2011/064814 mailed Oct. 18, 2011 (4 pages).
(Continued)

*Primary Examiner* — Edan Orgad
*Assistant Examiner* — Saumit Shah
(74) *Attorney, Agent, or Firm* — Osha Liang LLP

(57) ABSTRACT

A mobile communication method is discussed involving causing Mobile Switching Center (MSC) server/Circuit Switch-Media Gateway (CS-MGW) to transmit a path switching signal and activate a timer, causing User Equipment (UE) #2 to switch a transmission destination of a voice communication data signal addressed to UE#1 from Serving/Packet Data Network Gateway (S/P-GW) to the MSC server/CS-MGW, causing the MSC server/CS-MGW transmits a path restoration instruction signal if not detecting that handover of the UE#1 from Evolved Universal Terrestrial Radio Access Network (E-UTRAN) to UTRAN/GSM and EDGE Radio Access Network (GERAN) is completed before the timer expires, and causing the UE#2 to switch a transmission destination of the voice communication data signal addressed to the UE#1 from the MSC server/CS-MGW to the S/P-GW in response to the path restoration instruction signal.

10 Claims, 19 Drawing Sheets

(51) Int. Cl.
*H04W 36/00* (2009.01)
*H04M 7/12* (2006.01)

(56) References Cited

U.S. PATENT DOCUMENTS

| | | | |
|---|---|---|---|
| 2008/0267128 A1* | 10/2008 | Bennett et al. | 370/331 |
| 2010/0027507 A1* | 2/2010 | Li et al. | 370/331 |
| 2010/0056147 A1 | 3/2010 | Sun et al. | |
| 2010/0074223 A1* | 3/2010 | Mahdi | 370/331 |
| 2012/0172042 A1* | 7/2012 | Drevon et al. | 455/436 |

FOREIGN PATENT DOCUMENTS

| | | |
|---|---|---|
| WO | 2009/089987 A1 | 7/2009 |
| WO | 2009/121255 A1 | 10/2009 |

OTHER PUBLICATIONS

3GPP TS 23.216 V9.3.0; "3rd Generation Partnership Project; Technical Specification Group Services and System Aspects; Single Radio Voice Call Continuity (SRVCC); Stage 2 (Release 9)"; Mar. 2010 (41 pages).

3GPP TR 23.856 V1.0.0; "3rd Generation Partnership Project; Technical Specification Group Services and System Aspects; Single Radio Voice Call Continuity (SRVCC) enhancements; Stage 2 (Release 10)"; Mar. 2010 (52 pages).

NTT Docomo et al.; "New alternative X-HQ enhancement by local anchoring"; 3GPP TSG SA WG2 Meeting #76, TD S2-097453; San Jose Del Cabo, Mexico; Nov. 16-20, 2009 (7 pages).

3GPP TS 23.216 V9.4.0; "3rd Generation Partnership Project; Technical Specification Group Services and System Aspects; Single Radio Voice Call Continuity (SRVCC); Stage 2 (Release 9)"; Jun. 2010 (41 pages).

3GPP TR 23.856 V0.4.1.; "3rd Generation Partnership Project; Technical Specification Group Services and System Aspects; Single Radio Voice Call Continuity (SRVCC) enhancements; Stage 2 (Release 10)"; Mar. 2010 (51 pages).

* cited by examiner

MOBILE COMMUNICATION METHOD

TECHNICAL FIELD

The present invention relates to a mobile communication method.

BACKGROUND ART

Conventionally, there has been known a mobile communication system supporting a 2 G/3 G radio access network (UTRAN: Universal Terrestrial Radio Access Network or GERAN: GSM EDGE Radio Access Network), and an LTE (Long Term Evolution) scheme radio access network (E-UTRAN: Evolved Universal Terrestrial Radio Access Network).

The 3GPP TS23.216 specifies "SRVCC (Single Radio Voice Call Continuity) scheme" of switching a path for voice communications between a UE (User Equipment) #1 and a UE#2 from a path (a path for VoIP (Voice over IP) communications) via the E-TRAM or GERAN to a path (a path for circuit switch (CS: Circuit Switch) communications) via the UTRAN/GERAN (see, Non-patent document 1).

In addition, the Alt. 4, Alt. 10, Alt. 11, Alt. 12, etc., of the 3GPP TR23.856 v0.4.1 specify an SRVCC scheme (hereinafter, referred to as an SRVCC enhancement scheme) of switching a path for voice communications between UE#1 and UE#2 from a path via the E-UTRAN to a path via the UTRAN/GERAN in a visited network of the UE#1.

The SRVCC enhancement scheme can terminate signals required for switching a path for voice communications between the UE#1 and the UE#2 within the visited network of the UE#1. As compared with the conventional SRVCC scheme, a communication interruption time due to exchange of the signals between the visited network of the UE#1 and the home network of the UE#1 can be shortened.

PRIOR ART DOCUMENTS

Non-Patent Documents

Non-patent document 1: 3GPP TS23.216
Non-patent document 2: 3GPP TR23.856 v0.4.1

SUMMARY OF THE INVENTION

Problems to be Solved by the Invention

However, as shown in FIG. 14, in the procedure of the SRVCC scheme supporting PS (Packet Switch) handover, if "Initial of Session Transfer", that is, "INVITE" is transmitted to an IMS (IP Multimedia subsystem) at step 9, the UE#2 switches a transmission destination of a voice communication data signal addressed to the UE#1 from an S/P-GW (Serving/Packet Data Network Gateway, a gateway apparatus) to a CS-MGW.

Thereafter, as shown in FIG. 14, if the UE#1 fails to receive "HO from EUTRAN command (a handover instruction signal)" transmitted from the E-UTRAN at step S14 or if the E-UTRAN does not transmit "HO from EUTRAN command (a handover instruction signal)" in consideration of radio conditions and the like, the UE#1 continues staying in the E-UTRAN. Thus, there is a problem that the UE#1 cannot receive the voice communication data transmitted from the UE#2 through the path via the UTRAN/GERAN.

Similarly, as shown in FIG. 16, even in the procedure of the SRVCC scheme not supporting the PS handover, if the UE#1 fails to receive "HO from EUTRAN command (a handover instruction signal)" transmitted from the E-UTRAN at step S15 or if the E-UTRAN does not transmit "HO from EUTRAN command (a handover instruction signal)" in consideration of radio conditions and the like, the UE#1 continues staying in the E-UTRAN. Thus, there is a problem that the UE#1 cannot receive the voice communication data transmitted from the UE#2 through the path via the UTRAN/GERAN.

Also, as shown in FIG. 17, in the procedure of the SRVCC scheme supporting the PS handover, if an MSC server transmits "Initial of Session Transfer", that is, "INVITE" to an ATCF (Access Transfer Control Function) at step 9, an ATGW (Access Transfer Gateway) switches a transmission destination of a voice communication data signal addressed from the UE#2 to the UE#1 from a P-GW to a CS-MGW according to a procedure shown in FIG. 18.

Thereafter, as shown in FIG. 17, if the UE#1 fails to receive "HO from EUTRAN command (the handover instruction signal)" transmitted from the E-UTRAN at step S14 or if the E-UTRAN does not transmit "HO from EUTRAN command (the handover instruction signal)" in consideration of radio conditions and the like, the UE#1 continues staying in the E-UTRAN. Thus, there is a problem that the UE#1 cannot receive the voice communication data transmitted from the UE#2 through the path via the UTRAN/GERAN.

Similarly, as shown in FIG. 19, even in the procedure of the SRVCC enhancement scheme not supporting the PS handover, UE#1 fails to receive "HO from EUTRAN command (a handover instruction signal)" transmitted from the E-UTRAN at step S15, or if the E-UTRAN does not transmit "HO from EUTRAN command (the handover instruction signal)" in consideration of radio conditions and the like, the UE#1 continues staying in the E-UTRAN. Thus, there is a problem that the UE#1 cannot receive the voice communication data transmitted from the UE#2 through the path via the UTRAN/GERAN.

Under the above circumstances, the present invention is made in view of the above-described problems. Accordingly, an objective of the present invention is to provide a mobile communication method capable of avoiding an event where an UE#1 is disabled to perform communications in a control of switching a path for a voice communication data signal between the UE#1 and a UE#2 from a path via E-UTRAN to a path via UTRAN/GERAN, even in a case where an event causing an UE#1 to stay in E-UTRAN occurs, for example, in a case where the UE#1 fails to receive a handover instruction signal or where E-UTRAN does not transmit "HO from EUTRAN command (a handover instruction signal)" in consideration of radio conditions and the like.

A first characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a predetermined server for the second radio access network to transmit a path switching signal and activate a timer; causing the second mobile station to switch a transmission destination of the voice communication data signal addressed to the first mobile station from a gateway apparatus connected with the first radio access network to the predetermined server based on the path switching signal; causing the predetermined server to transmit a path restoration instruction signal if not detecting that handover of the first mobile station from the first radio access network to the second radio access network is completed before the timer expires; and causing the second mobile station to switch the transmission destination of the voice communication data signal addressed to the first mobile station from the predetermined server to the gateway apparatus in response to the path restoration instruction signal.

A second characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a circuit switch connected with the second radio access network to transmit a circuit establishing signal and activate a timer; causing a predetermined server for the second radio access network to transmit a path switching signal in response to the circuit establishing signal; causing the second mobile station to switch a transmission destination of the voice communication data signal addressed to the first mobile station from a gateway apparatus connected with the first radio access network to the predetermined server based on the path switching signal; causing the circuit switch to transmit a timer expiration signal if not detecting that handover of the first mobile station from the first radio access network to the second radio access network is completed before the timer expires; causing the predetermined server to transmit a path restoration instruction signal in response to the timer expiration signal; and causing the second mobile station to switch the transmission destination of the voice communication data signal addressed to the first mobile station from the predetermined server to the gateway apparatus in response to the path restoration instruction signal.

A third characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps: causing a controller in the second radio access network to transmit a handover preparation completion signal and activate a timer; causing a circuit switch connected with the second radio access network to transmit a circuit establishing signal after having received the handover preparation completion signal; causing a predetermined server for the second radio access network to transmit a path switching signal in response to the circuit establishing signal; causing the second mobile station to switch a transmission destination of the voice communication data signal addressed to the first mobile station from a gateway apparatus connected with the first radio access network to the predetermined server based on the path switching signal; causing the controller to transmit a timer expiration signal if not detecting that handover of the first mobile station from the first radio access network to the second radio access network is completed before the timer expires; causing the predetermined server to transmit a path restoration instruction signal in response to the timer expiration signal; and causing the second mobile station to switch the transmission destination of the voice communication data signal addressed to the first mobile station from the predetermined server to the gateway apparatus in response to the path restoration instruction signal.

A fourth characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a predetermined server for the second radio access network to transmit a path switching signal; causing the second mobile station to switch a transmission destination of the voice communication data signal addressed to the first mobile station from a gateway apparatus connected with the first radio access network to the predetermined server based on the path switching signal; causing the predetermined server to transmit a path restoration instruction signal if detecting that handover of the first mobile station from the first radio access network to the second radio access network is interrupted; and causing the second mobile station to switch the transmission destination of the voice communication data signal addressed to the first mobile station from the predetermined server to the gateway apparatus in response to the path restoration instruction signal.

A fifth characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a predetermined server for the second radio access network to transmit a path switching signal; causing a path switching apparatus to switch a transmission destination of the voice communication data signal addressed from the second mobile station to the first mobile station from a gateway apparatus connected with the first radio access network to the predetermined server based on the path switching signal, and to activate a timer; and causing the path switching apparatus to switch the transmission destination of the voice communication data signal addressed from the second mobile station to the first mobile station from the gate way apparatus to the predetermined server if not detecting that switching of the path for the voice communication data signal from the path via the first radio access network to a path via the second radio access network is completed before the timer expires.

A sixth characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a predetermined server for the second radio access network to transmit a path switching signal and activate a timer; causing a path switching apparatus to switch a transmission destination of the voice communication data signal addressed from the second mobile station to the first mobile station from a gateway apparatus connected with the first radio access network to the predetermined server based on the path switching signal; causing the predetermined server to transmit a path restoration instruction signal if not detecting that handover of the first mobile station from the first radio access network to the second radio access network is completed before the timer expires; and causing the path switching apparatus switches the transmission destination of the voice communication data signal addressed from the second mobile station to the first mobile station from the predetermined server to the gateway apparatus in response to the path restoration instruction signal.

A seventh characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a circuit switch connected with the second radio access network to transmit a circuit establishing signal and activate a timer; causing a predetermined server for the second radio access network to transmit a path switching signal in response to the circuit establishing signal; causing a path switching apparatus to switch a transmission destination of the voice communication data signal addressed from the second mobile station to the first mobile station from a gateway apparatus connected with the first radio access network to the predetermined server based on the path switching signal; causing the circuit switch to transmit a timer expiration signal if not detecting that handover of the first mobile station from the first radio access network to the second radio access network is completed before the timer expires; causing the predetermined server to transmit a path restoration instruction signal in response to the timer expiration signal; and causing the path switching apparatus to switch the transmission destination of the voice communication data signal addressed from the second mobile station to the first mobile station from the predetermined server to the gateway apparatus in response to the path restoration instruction signal.

A eighth characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a controller in the second radio access network to transmit a handover preparation completion signal and activate a timer; causing a circuit switch connected with the second radio access network to transmit a circuit establishing signal after having received the handover preparation completion signal; causing a predetermined server for the second radio access network to transmit a path switching signal in response to the circuit establishing signal; causing a path switching apparatus to switch a transmission destination of the voice communication data signal addressed from the second mobile station to the first mobile station from a gateway apparatus connected with the first radio access network to the predetermined server based on the path switching signal; causing the controller to transmit a timer expiration signal if not detecting that handover of the first mobile station from the first radio access network to the second radio access network is completed before the timer expires; causing the predetermined server to transmit a path restoration instruction signal in response to the timer expiration signal; and causing the path switching apparatus to switch the transmission destination of the voice communication data signal addressed from the second mobile station to the first mobile station from the predetermined server to the gateway apparatus in response to the path restoration instruction signal.

A ninth characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a predetermined server for the second radio access network to transmit a path switching signal; causing a path switching apparatus to switch a transmission destination of the voice communication data signal addressed from the second mobile station to the first mobile station from a gateway apparatus connected with the first radio access network to the predetermined server based on the path switching signal; causing the predetermined server to transmit a path restoration instruction signal if detecting that handover of the first mobile station from the first radio access network to the second radio access network is interrupted; and causing the path switching apparatus to switch the transmission destination of the voice communication data signal addressed from the second mobile station to the first mobile station from the predetermined server to the gateway apparatus in response to the path restoration instruction signal.

A tenth characteristic of the present invention is a mobile communication method of switching a path for a voice communication data signal between a first mobile station and a second mobile station from a path via a first radio access network not supporting a circuit switch communication to a path via a second access network supporting a circuit switch communication, the mobile communication method including the steps of: causing a mobility management node connected with the first radio access network to transmit a path switching signal and activate a timer; causing a gateway apparatus connected with the first radio access network to switch a transmission destination of the voice communication data signal addressed from the second mobile station to the first mobile station from the first radio access network to the predetermined server based on the path switching signal; causing the mobility management node to transmit a path restoration instruction signal if not detecting that handover of the first mobile station from the first radio access network to the second radio access network is completed before the timer expires; and causing the gateway apparatus to switch the transmission destination of the voice communication data signal addressed from the second mobile station to the first mobile station from the predetermined server to the first radio access network in response to the path restoration instruction signal.

Effects of the Invention

As described above, the present invention can provide a mobile communication method which can avoid an event where the UE#1 is disabled to perform communications in the control of switching the path for a voice communication data signal between the UE#1 and the UE#2 from a path via the E-UTRAN to a path via the UTRAN/GERAN, even in a case where an event causing the UE#1 to stay in an E-UTRAN occurs, for example, in a case where the UE#1 fails to receive a handover instruction signal or where the E-UTRAN does not transmit "HO from EUTRAN command (the handover instruction signal)" in consideration of radio conditions and the like.

MODES FOR CARRYING OUT THE INVENTION

First Embodiment of the Invention

Referring to FIGS. 1 to 4, a mobile communication system according to a first embodiment of the invention is described.

The mobile communication system according to the present embodiment includes an E-UTRAN and a UTRAN/GERAN.

Figure 1:
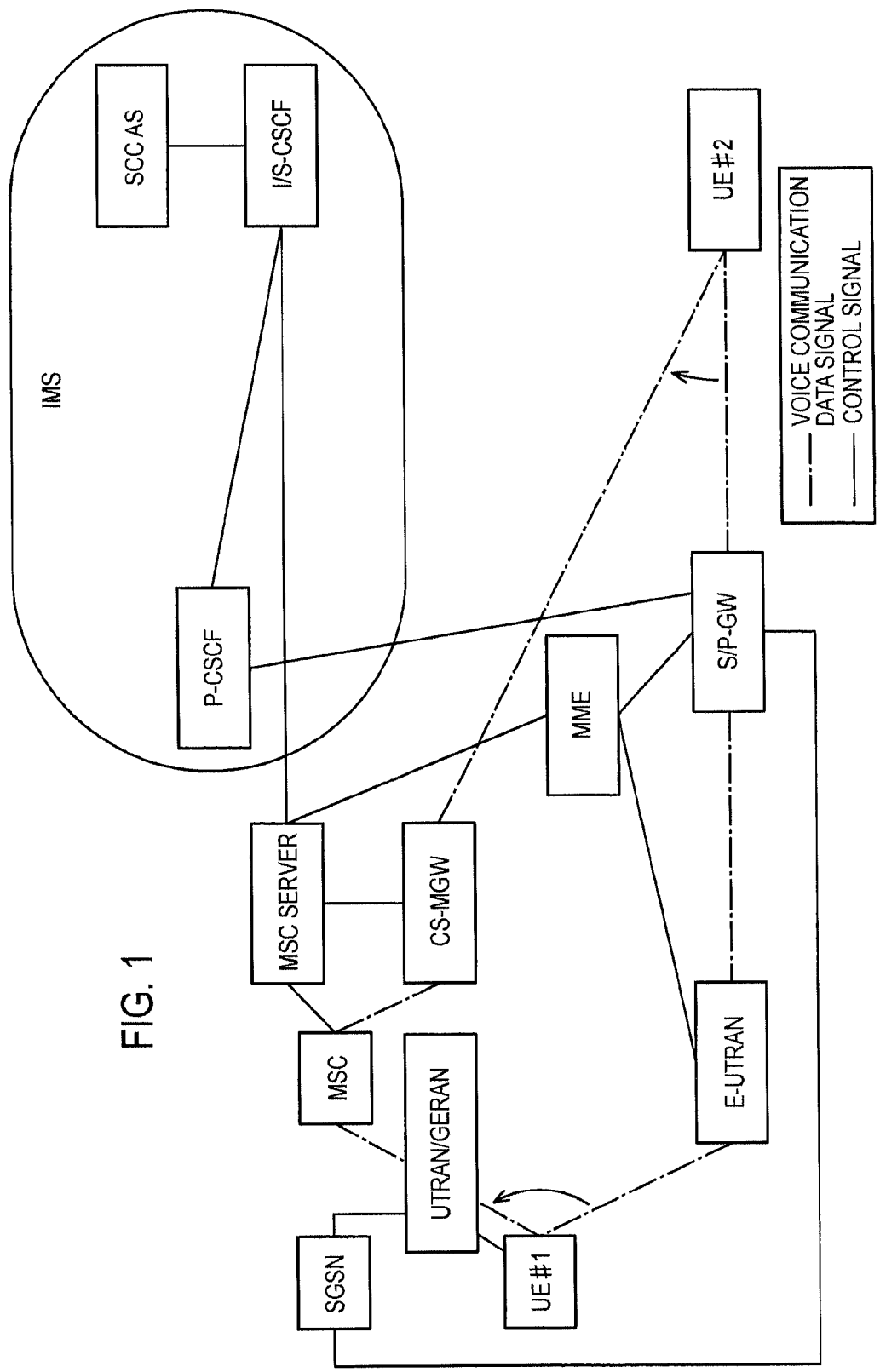
FIG. 1 is a configuration diagram of an overall mobile communication system according to a first embodiment of the present invention.

Specifically, as shown in FIG. 1, the mobile communication system according to the present embodiment includes an E-UTRAN, a UTRAN/GERAN, an IME, an MME (Mobility Management Entity, a mobility management node), an S/P-GW (Serving-Gateway, a serving gateway apparatus), an S/P-GW, an MSC (Mobile Switching Center, a circuit switch), an SGSN (Serving GPRS Support Node, a packet switch), an MSC server/CS-MG, and the like.

Also, the IMS includes a P-CSCF (Proxy-Call Session Control Function), an I/S-CSCF (Interogation/Serving-Call Session Control Function), an SCC AS (Service Centralization and Continuity Application Server), and the like.

Here, in the mobile communication system according to the present embodiment, a path for voice communications between UE#1 and UE#2 can be switched using an SRVCC scheme from a path (a path for IMS VoIP communications) via an E-UTRAN or UTAN to a path (a path for circuit switching communications) via UTRAN/GERAN.

Hereinafter, referring to FIGS. 2 to 4, an operation of the mobile communication system according to the present embodiment is described.

Figure 2:
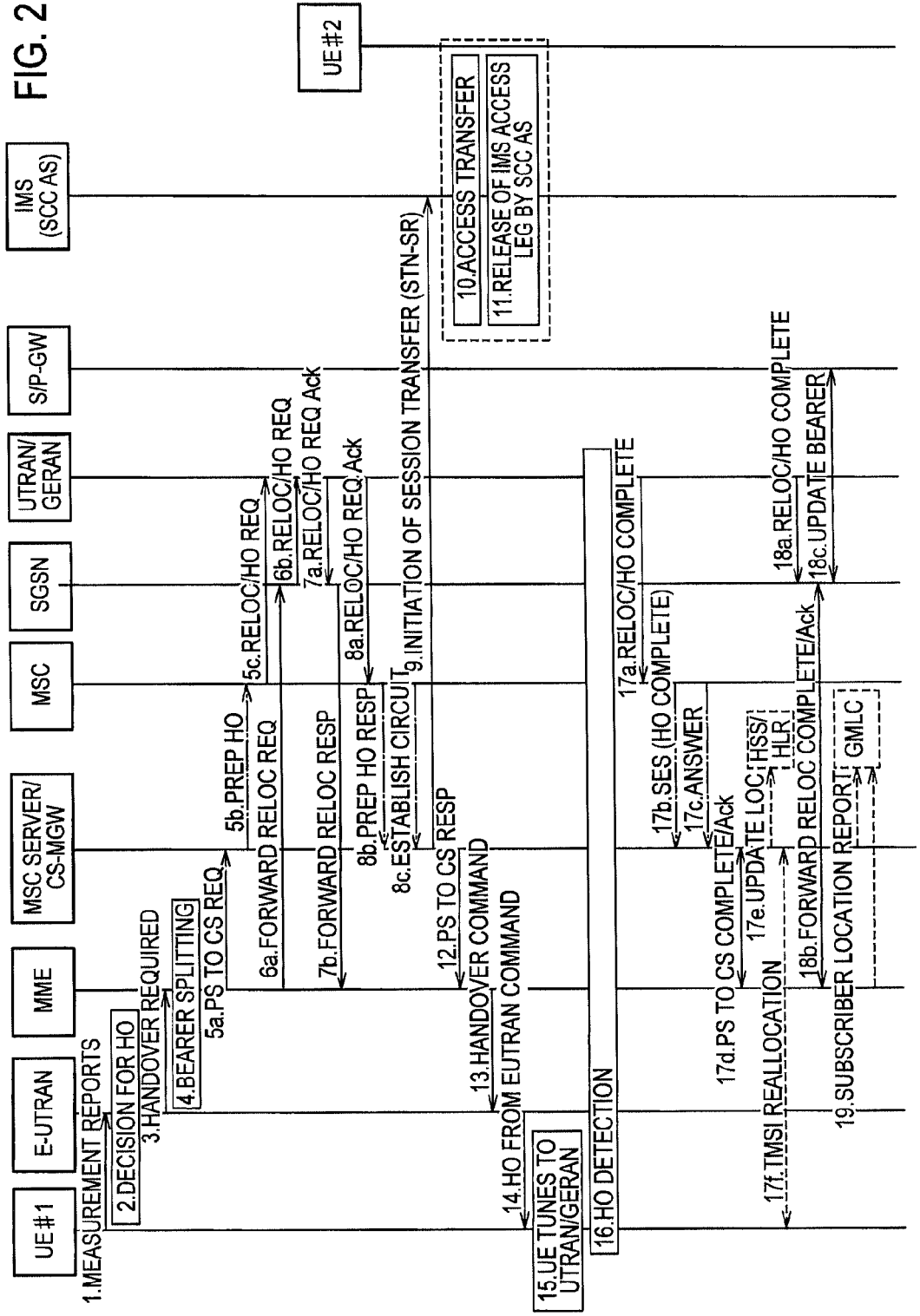
FIG. 2 is a sequence diagram illustrating an operation of the radio communication system according to the first embodiment of the present invention.
Figure 3:
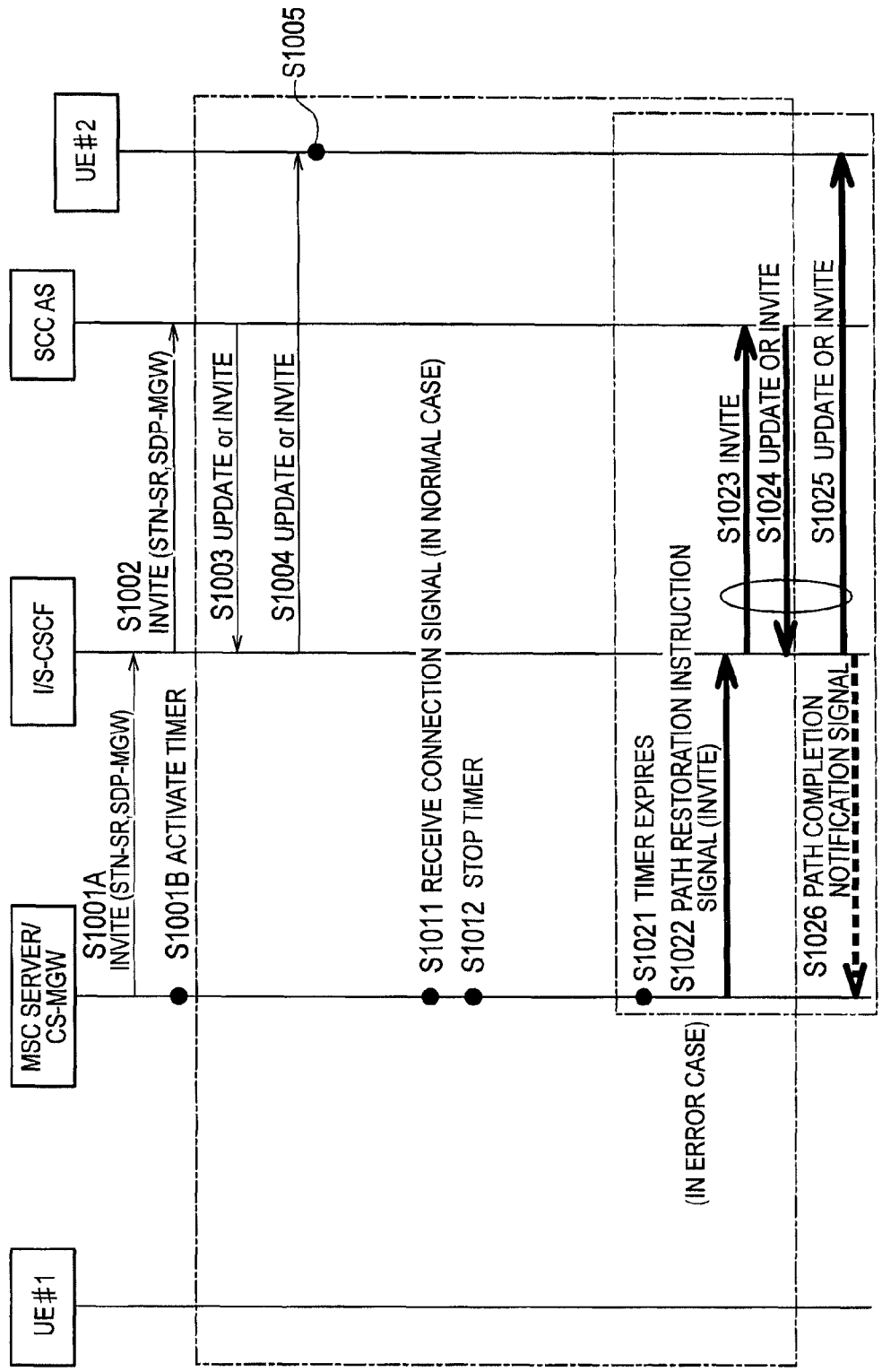
FIG. 3 is a sequence diagram illustrating an operation of the radio communication system according to the first embodiment of the present invention.

The description is given here by referring FIGS. 2 and 3 of an operation in which the path for voice communications between the UE#1 and the UE#2 is switched using the SRVCC scheme supporting PO handover in the mobile communication system according to the present embodiment from the path via the E-UTRAN to the path via the UTRAN/GERAN.

As shown in FIG. 2, the UE#1 determines that "Measurement reports" is transmitted to an eNB (a radio base station) in the E-UTRAN at step 1, and the eNB determines that handover of the UE#1 is performed from the E-UTRAN to the UTRAN/GERAN at step 2.

The eNB transmits "Handover required" to the MME at step 3, and the MME performs "Bearer Splitting" at step 4.

The MME transmits "PS to CS Req" to the MSC server/CS-MGW at step 5a and transmits "Forward Reloc Req" to the SGSN at step 6a.

The MSC server/CS-MGW transmits "Prep HO" to the MSC at step 5b, and, the MSC transmits "Reloc/HO Req" to the UTRAN/GERAN at step 5c.

The SGSN transmits "Reloc/HO Req" to the UTRAN/GERAN at step 6b, the UTRAN/GERAN transmits "Reloc/HO Req Ack" to the SGSN at step 7a, and the SGSN transmits "Forward Reloc Req" to the MME at step 7b.

The UTRAN/GERAN transmits "Reloc/HO Req Ack" to the MSC at step 8s, and the MSC transmits "Prep HO Resp" to the MSC server/CS-MGW at step 8b, and transmits "Establish circuit" at step 8c.

At step 9, the MSC server/CS-MGW transmits "Initiation of Session Transfer ("INVITE" at step S1001A in FIG. 3)" to the IMS.

Here, as shown in FIG. 3, when the MSC server/CS-MGW transmits "INVITE (a path switching signal)" to the I/S-CSCF at step S1001A, the MSC server/CS-MGW activates a timer at step S1001B.

The I/S-CSCF transmits "INVITE" to the SCC AS at step 1002, and the SCC AS transmits "UPDATE" or "INVITE" to the I/S-CSCF at step S1003, and the I/S-CSCF transmits "UPDATE" or "INVITE" to the UE#2 at step S1004.

Note that when a response signal is received from the UE#2 via the I/S-CSCF at step 1002 or after the step 1005 is performed, the SCC AS holds information (for example, an identifier of P-GW, an IP address, or the like) relating to a transmission destination of a voice communication data signal before the switching. This information may be held in association with an identifier of a mobile station such as STN-SR. Or, the information relating to the transmission destination of the voice communication data signal before the switching may be held in the S-CSCF.

At step S1005, the UE#2 switches the transmission destination of the voice communication data signal addressed to the UE#1 from the S/P-GW to the MSC server/CS-MGW in response to "UPDATE" or "INVITE", which is a path switching signal.

Returning to FIG. 2, the MSC server/CS-MGW transmits "PS to CS Resp" to the MME at step 12, the MME transmits "Handover Command" to the eNB at step 13, and the eNB transmits "HO from EUTRAN command" to the UE#1 at step 14.

At step 15, the UE#1 performs switching of a communication path for the voice communication data signal from the E-UTRAN to the UTRAN/GERAN in response to "HO from EUTRAN command".

At step 16, handover processing of the UE#1 from the E-UTRAN to the UTRAN/GERAN is performed.

The UTRAN/GERAN transmits "Reloc/HO Complete" to the MSC at step 17*a*, and the MSC transmits SEC (HO Complete) to the MSC server/CS-MGW at step 17*b*, and transmits "ANSWER" at step 17*c*.

The operation after the step 17*d* is same as the procedure of the existing SRVCC scheme.

Returning to FIG. 3 here, if the MSC server/CS-MGW receives "SES (HO Complete)" or "ANSWER" from the MSC at step S1011 before the timer expires, that is, detects that the handover of the UE#1 from the E-UTRAN to the UTRAN/GEAN is completed, the MSC server/CS-MGW stops the timer at step S1012.

On the other hand, if the timer expires at step S1021 before "SES (HO Complete)" or "ANSWER" is received, at step S1022, the MSC server/CS-MGW transmits a path restoration signal such as "INVITE" to the I/S-CSCF in the IMS.

The I/S-CSCF transmits "INVITE" to the SCC AS at step S1023, and the SCC AS transmits "UPDATE" or "INVITE" to the I/S-CSCF at step S1024, and the I/S-CSCF transmits "UPDATE" or "INVITE" containing P-GW information, which is switching destination information, to the UE#2 at step S1025.

Note that at step 1024, the SCC AS may transmit P-GW information, which is switching destination information, at the same time when "UPDATE" or "INVITE" is transmitted to the I/S-CSCF. Instead, the information may be set from the information held in the S-CSCF.

As a result, the UE#2 switches the transmission destination of the voice communication data signal addressed to the UE#1 from the MSC server/CS-MGW to the S/P-GW in response to "UPDATE" or "INVITE", which is a path switching signal.

At step S1026, the I/S-CSCF may transmit a path complete notification signal to the MSC server/CS-MGW.

Figure 4:
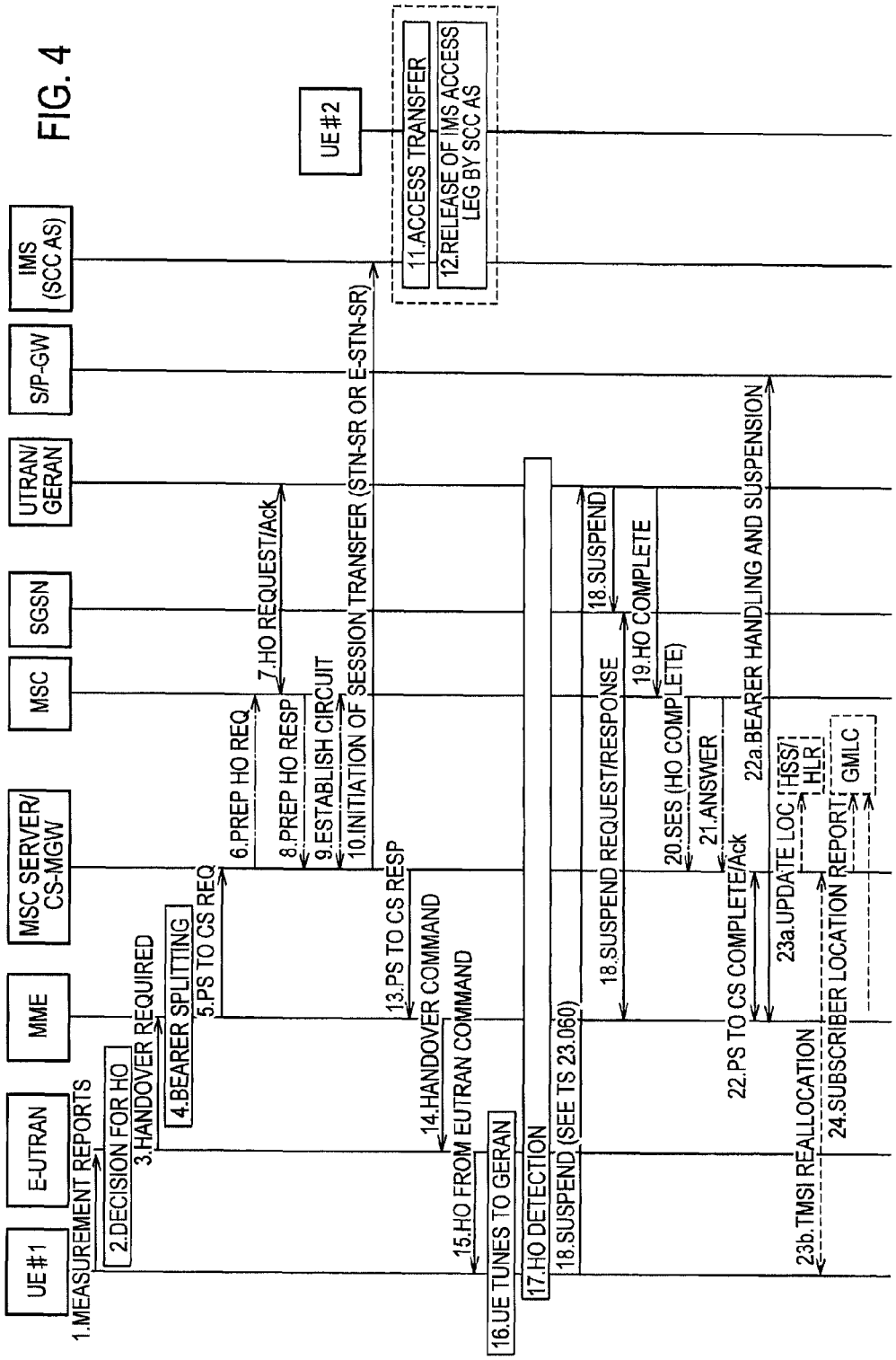
FIG. 4 is a sequence diagram illustrating an operation of the radio communication system according to the first embodiment of the present invention.

Not that FIG. 4 shows an operation in which a path for voice communications between the UE#1 and the UE#2 is switched from the path via the E-UTRAN to the path via the UTRAN/GERAN by using the SRVCC scheme not supporting PO handover, in the mobile communication system according to the present embodiment.

Such operation is same as the operation illustrated in FIGS. 2 and 3, except that the operation relating to the PO handover is not contained.

In the mobile communication system according to the present embodiment, the MSC server/CS-MGW is configured to return the transmission destination of the voice communication data signal addressed from the UE#2 to the UE#1 from the MSC server/CS-MGW to the S/P-GW if completion of handover of the UE#1 from the E-UTRAN to the UTRAN/GERAN is not detected before a predetermined period of time expires since "Initiation of Session Transfer (that is, "INVITE")" has been transmitted. Thus, even if an event causing the UE#1 to stay in the E-UTRAN occurs, that is, in a case where the UE#1 fails to receive a handover instruction signal, or where the E-UTRAN does not transmit "HO from EUTRAN command (the handover instruction signal)" in consideration of radio conditions and the like, an event where the UE#1 is disabled to perform communications can be avoided.

(Modification 1)

Hereinafter, a mobile communication system according to Modification 1 of the first embodiment is described by paying an attention to differences with the mobile communication system according to the first embodiment.

In a mobile communication system according to Modification 1, in place of an MSC server/CS-MGW, an MSC is configured to transmit "Establish circuit (a circuit establishing signal)" to the MSC server/CS-MGW and activate a timer.

Then, the MSC is configured to transmit a timer expiration signal to the MSC server/CS-MGW if completion of handover of the UE#1 from the E-UTRAN to the UTRAN/GERAN is not detected before the timer expires.

Here, the MSC server/CS-MGW is configured to transmit a path restoration instruction signal to an I/S-CSCF in response to the timer expiration signal.

On the other hand, the MSC stops the timer if completion of handover of the UE#1 from the E-UTRAN to the UTRAN/GERAN is not detected before the timer expires.

(Modification 2)

Hereinafter, a mobile communication system according to Modification 2 of the first embodiment is described by paying an attention to differences with the mobile communication system according to the first embodiment.

In the mobile communication system according to Modification 2, in place of an MSC server/CS-MGW, a RNC (Radio Network Controller) in UTRAN/GERAN is configured to transmit "Reloc/HO Req Ack (a handover preparation completion signal)" to the MSC and activate a timer.

Here, the RNC is configured to transmit a timer expiration signal to the MSC server/CS-MGW via the MSC if completion of handover of the UE#1 from the E-UTRAN to the UTRAN/GERAN is not detected before the timer expires.

Note that the MSC server/CS-MGW is configured to transmit a path restoration instruction signal to an I/S-CSCF in response to the timer expiration signal.

(Modification 3)

Hereinafter, a mobile communication system according to Modification 3 of the first embodiment is described by paying an attention to differences with the mobile communication system according to the first embodiment.

In a mobile communication system according Modification 3, an MSC server/CS-MGW is configured to, instead of performing timer control, transmit a path restoration instruction signal if the MSC server/CS-MGW detects that handover of UE#1 from the E-UTRAN to the UTRAN/GERAN is interrupted.

For example, the MSC server/CS-MGW may detect the handover interruption by detecting release processing to be activated by a RNC or MSC.

Also, the MSC server/CS-MGW may be configured to detect that the handover of the UE#1 from the E-UTRAN to the UTRAN/GERAN is interrupted when a handover cancellation signal transmitted by the MME is received.

Figure 5:
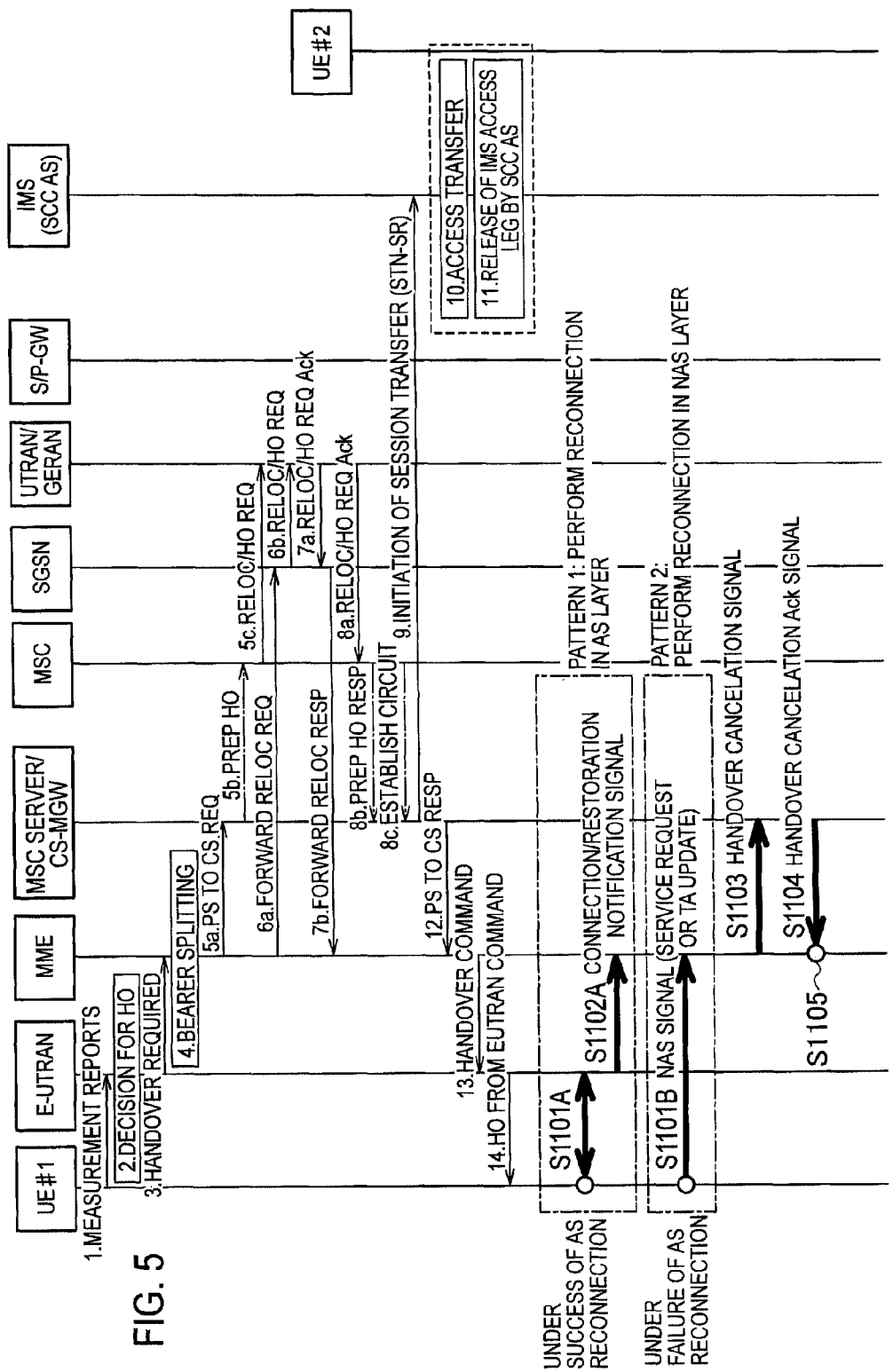
FIG. 5 is a sequence diagram illustrating an operation of a radio communication system according to Modification 3 of the first embodiment of the present invention.

Specifically, as shown in FIG. 5, after the UE#1 fails to receive "HO from E-UTRAN command" transmitted by the E-UTRAN at step 14, or after "HO from EUTRAN command" has received but the switching to the path via the GERAN/UTRAN is failed, the E-UTRAN transmits a connection/restoration notification signal to the MME at step S1102A, when reconnection in an AS (Access Stratum) layer for the E-UTRAN succeeds at step S1101A.

On the other hand, as shown in FIG. 5, if the reconnection in the AS layer for the E-UTRAN is failed after the UE#1 fails to receive "HO from EUTRAN command" transmitted by the E-UTRAN at step 14 or after "HO EUTRAN command" is received but switching to a path via the GERAN/UTRAN is failed, the UE#1 transmits NAS (Non-Access Stratum) signal such as "Service Request" or "TA (Tracking Area) Update" to the MME, that is, performs reconnection in the NAS layer with the MME, at step S1101B.

When the connection/restoration notification signal or the NAS signal is received, the MME transmits a handover cancellation signal ("PS to CS Cancel Notification") to the MSC server/CS-MGW at step S1103.

When the MSC server/CS-MGW receives the handover cancellation signal, the operation from step S1022 to S1026 in FIG. 3 is performed.

In addition, when the handover cancellation signal is received, the MSC server/CS-MGW transmits a handover cancellation Ack signal ("PS to CS Cancel Notification Ack") to the MME at step S1104.

When the handover cancellation Ack signal is received, the MME transmits "Session Reestablishment trigger notification" to the UE#1.

Here, if the handover cancellation Ack signal is received at step S1105, the MME may determine whether "Session Reestablishment trigger notification" is transmitted to the UE#1, based on UE capability (for example, whether "Session Reestablishment trigger notification" is supported), whether the SRVCC enhancement scheme is implemented, "Cause value" contained in the handover cancellation Ack signal, a reason why the MME detected the reconnection (for example, reconnection in AS layer or reconnection in NAS layer), or a handover state received from the MME in connection before the reconnection.

Second Embodiment of the Invention

By referring to FIGS. 6 to 9, a mobile communication system according to a second embodiment of the present invention is described below by paying attention to differences with the mobile communication system according to the above-described first embodiment.

Figure 6:
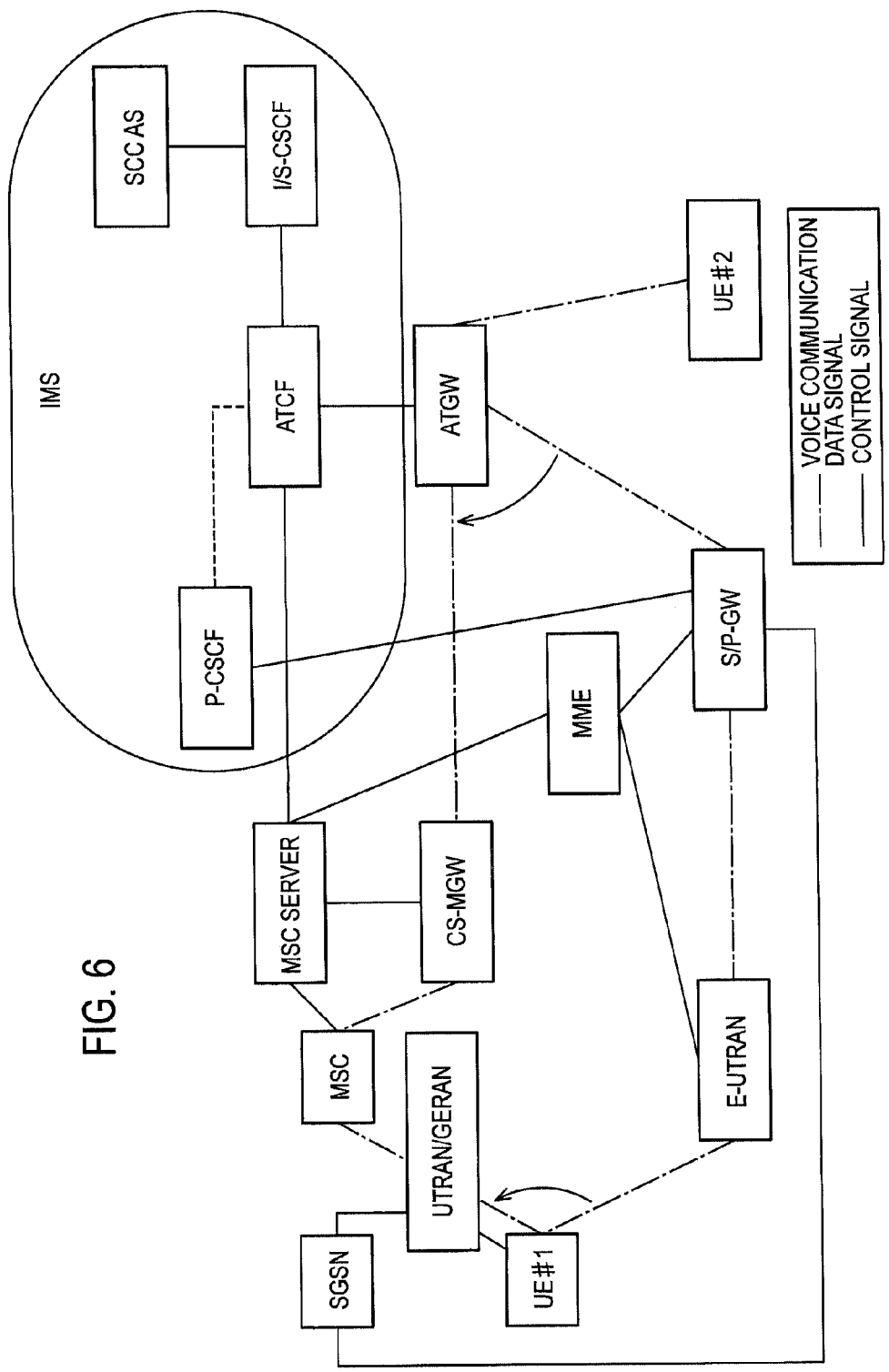
FIG. 6 is a configuration diagram of an overall mobile communication system according to a second embodiment of the present invention.

As shown in FIG. 6, a mobile communication system according to the present embodiment includes an ATGW and an ATCF in an IMS in addition to the configuration shown in FIG. 1.

Here, in the mobile communication system according to the present embodiment, a path for voice communications between UE#1 and UE#2 can be switched using the SRVCC enhancement scheme from a path (a path for IMS VoIP communications) via E-UTRAN or UTRAN to a path (a path for circuit switch communications) via UTRAN/GERAN.

Figure 7:
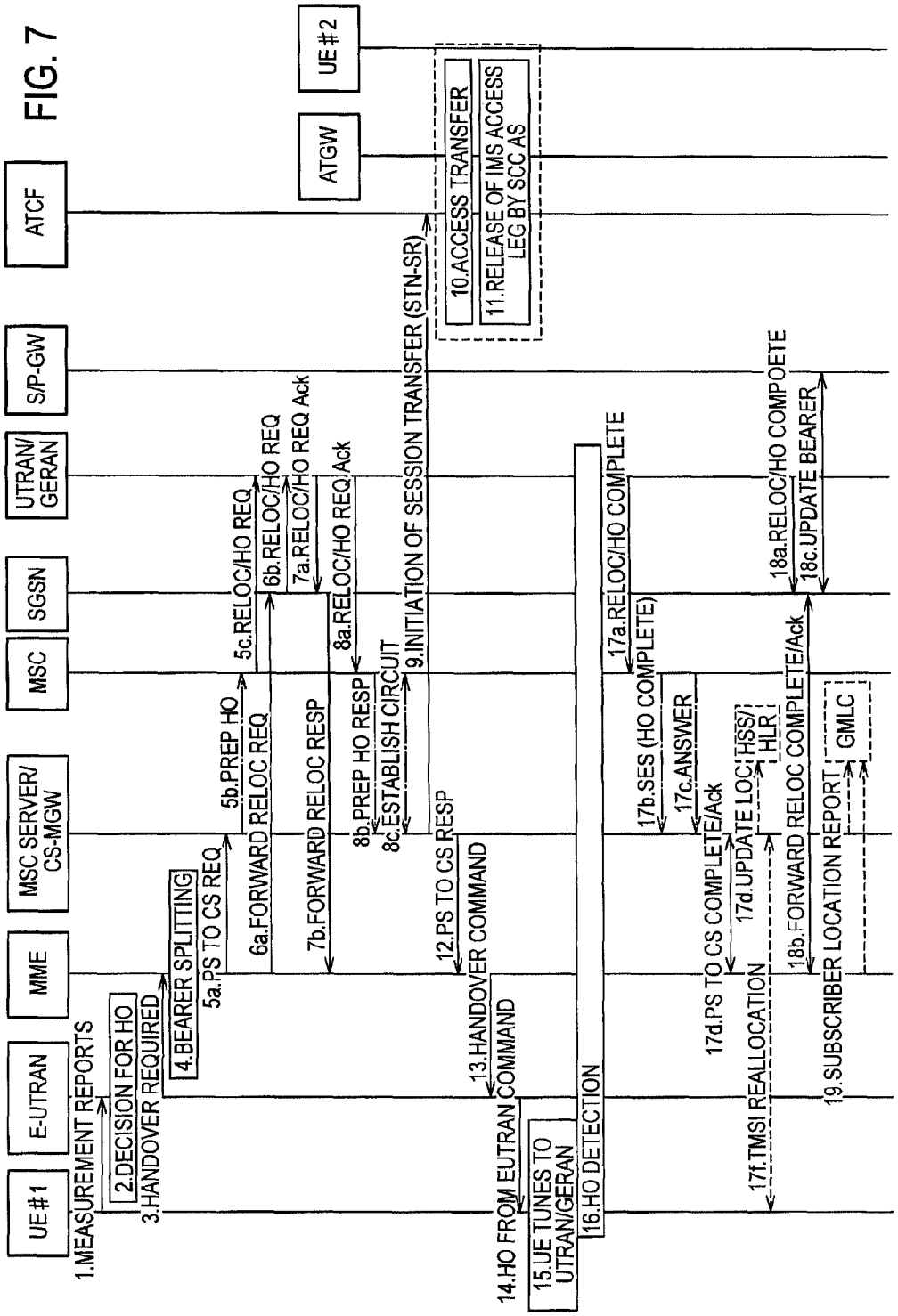
FIG. 7 is a sequence diagram illustrating an operation of the radio communication system according to the second embodiment of the present invention.
Figure 8:
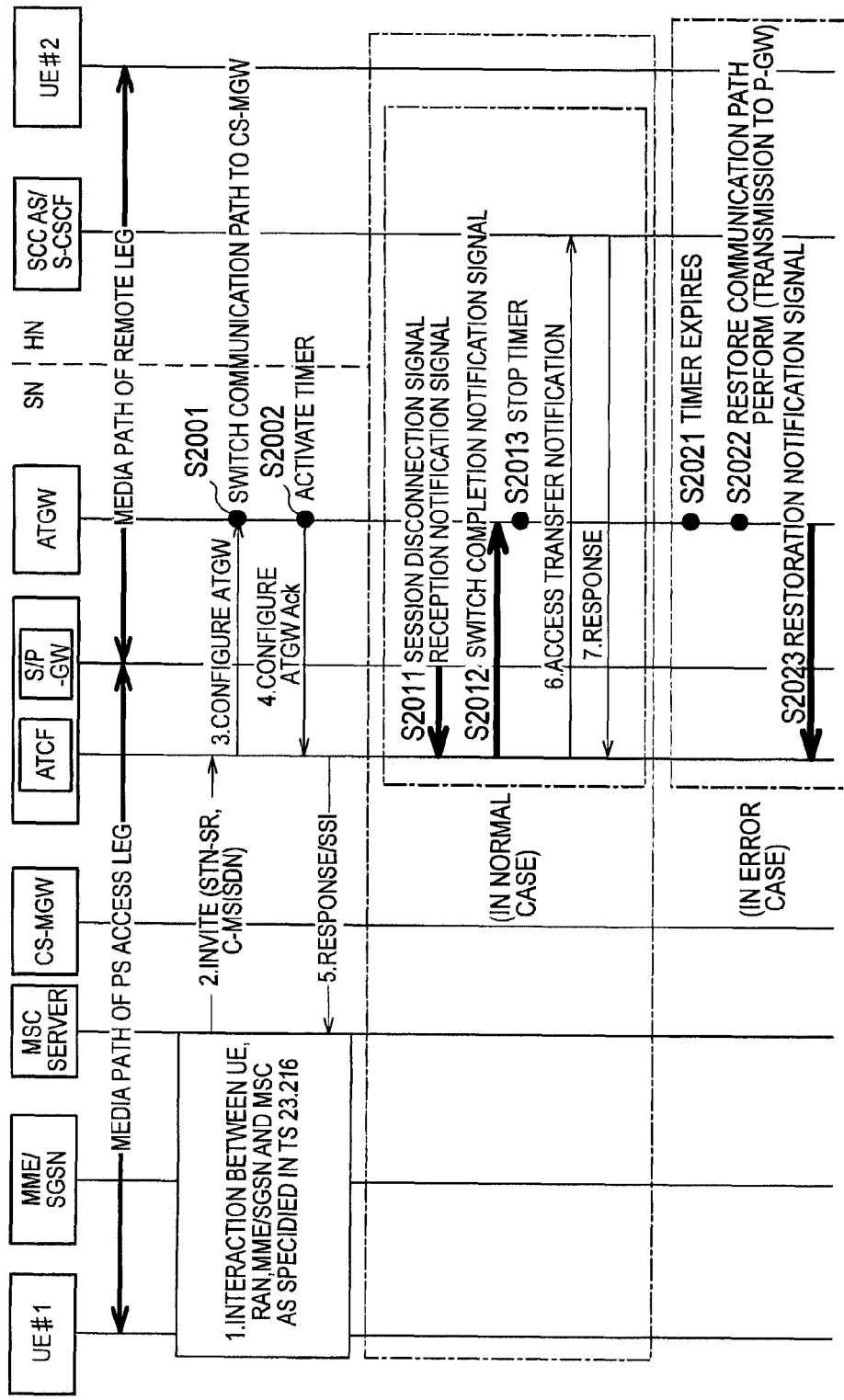
FIG. 8 is a sequence diagram illustrating an operation of the radio communication system according to the second embodiment of the present invention.

The description is given here by referring FIGS. 7 and 8 of an operation in which the path for voice communications between the UE#1 and the UE#2 is switched in the mobile communication system according to the present embodiment from the path via the E-UTRAN to the path via the UTRAN/GERAN, using the SRVCC enhancement scheme supporting PO handover.

At step 9, an MSC server/CS-MGW transmits "Initiation of Session Transfer ("INVITE" at step 2 in FIG. 8)" to the ATCF in the IMS.

Here, as shown in FIG. 8, when the MSC server/CS-MGW transmits "INVITE (a path switching signal)" to the ATCF at step 2, the ATCF transmits "Configure ATGW" to the ATGW at step 3.

Here, when receiving "Configure ATGW" of a path switching signal, the ATGW switches a transmission destination of the voice communication data signal addressed from the UE#2 to the UE#1 from the S/P-GW to the MSC server/CS-MGW at step S2001, and activates a timer at step S2002, and transmits "Configure ATGW Ack" to the ATCF at step 4.

After that, if the ATGW detects that switching of the path for the voice communication data signal from the path via the E-UTRAN to the path via the UTRAN/GERAN is completed before the timer expires, that is, receives the switching completion notification signal from the ATCF at step S2012, the ATGW stops the timer at step S2013.

On the other hand, if the ATGW does not detect that the switching of the path for the voice communication data signal transmitted from the path via the E-UTRAN to the path for the UTRAN/GERAN is completed at step S2021, that is, does not detect that the timer has expired without receiving the switching completion notification signal from the ATCF, the ATGW switches the transmission destination of the voice communication data signal addressed from the UE#2 to the UE#1 from the S/P-GW to the MSC server/CS-MGW at step S2022, and transmits a restoration notification signal to the ATCF at step S2023.

Note that when receiving "Configuration ATGW" at step 2001, the ATGW holds information (for example, an identifier of P-GW or an IP address) relating to the transmission destination of the voice communication data signal before switching. This information may be held in association with an identifier of a mobile station such as STN-SR or C-MSISDN.

Here, if the ATGW and the P-GW are same apparatus, the session disconnection reception notification signal at step S2011 does not need to be transmitted. In such a case, the ATCF/P-GW always transmits "Access Transfer Notification" to the SCC AS/S-CSCF at step 6 after "Response/SSI" is transmitted at step 5.

Figure 9:
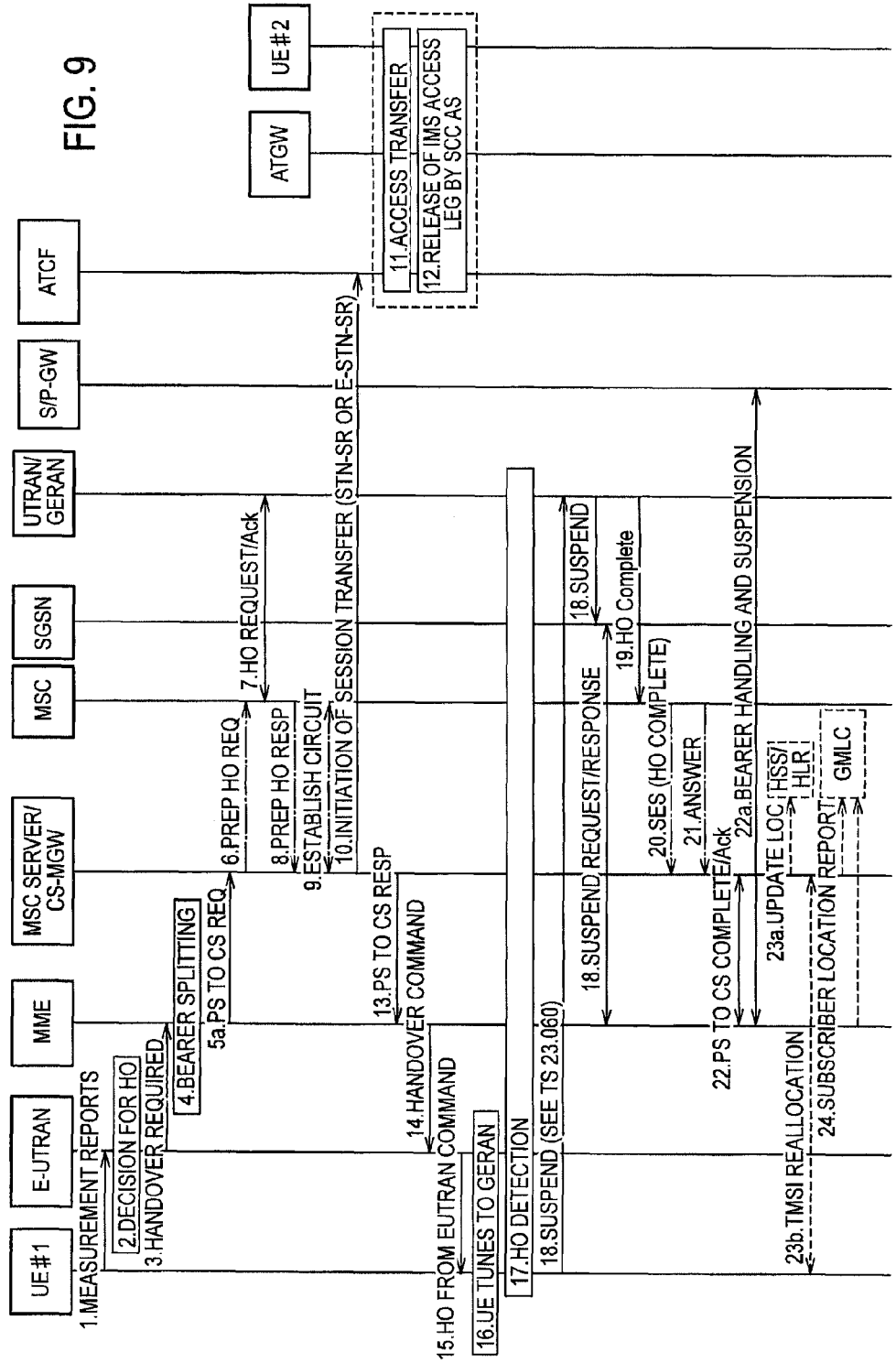
FIG. 9 is a sequence diagram illustrating an operation of the radio communication system according to the second embodiment of the present invention.

Note that FIG. 9 illustrates an operation in which the path for voice communications between the UE#1 and the UE#2 is switched from the path via the E-UTRAN to the path via the UTRAN/GERAN by using the SRVCC enhancement scheme not supporting PO handover, in the mobile communication system according to the present embodiment.

Such operation is same as the operation illustrated in FIGS. 6 and 7, except that the operation relating to the PO handover is not contained.

In the mobile communication system according to the present embodiment, the ATGW is configured to return the transmission destination of the voice communication data signal addressed from the UE#2 to the UE#1 from the MSC server/CS-MGW to the S/P-GW if the ATGW does not detect that switching of the path for the voice communication data signal from the path via the E-UTRAN to the path via the UTRAN/GERAN is completed before a predetermined period of time expires since "Configure ATGW" has been transmitted. Thus, even if an event causing the UE#1 to stay in the E-UTRAN occurs, such as, in a case where the UE#1 fails to receive a handover instruction signal, or if the E-UTRAN does not transmit "HO from EUTRAN command (a handover instruction signal)" in consideration of radio conditions and the like, an event where the US#1 is disabled to perform communications can be avoided.

Third Embodiment of the Invention

By referring to FIG. 9, a mobile communication system according to a third embodiment of the present invention is described below by paying attention to differences with the mobile communication system according to the above-described second embodiment.

As shown in FIG. 9, an MSC server/CS-MGW transmits "INVITE (a path switching signal)" to an ATCF at step 2, and activates a timer at step S3001.

Here, when receiving "Configure ATGW" of a path switching signal at step 3, the ATGW switches a transmission destination of the voice communication data signal addressed from the UE#2 to the UE#1 from the S/P-GW to the MSC server/CS-MGW at step S3002, and transmits "Configure ATGW Ack" to the ATCF at step 4.

Thereafter, if the MSC server/CS-MGW detects that handover of the UE#1 from the E-UTRAN to the UTRAN/GEAN is completed before the timer expires, that is, receives "SES (HO Complete)" or "ANSWER" from the MSC at step S3011 before the timer expires, the MSC server/CS-MGW stops the timer at step S3012.

In such a case, at step S3013, the MSC server/CS-MGW may transmit a switching success notification signal to the ATCF.

In such a case, "Access Transfer Notification" at step 6 and "Response" at step 7 are allowed to be transmitted only when the handover of the UE#1 from the E-TRAN to the UTRAN/GERAN is normally completed.

On the other hand, the MSC server/CS-MGW transmits a path restoration instruction signal to the ATCF at step S3022 if detecting that the timer has expired without detecting that the handover of the UE#1 from the E-UTRAN to the UTRAN/GERAN is completed at step S3021, or without receiving "SES (HO Complete)" or "ANSWER" from the MSC.

At step S3023, the ATCF transmits "Configure ATGW" to the ATGW.

Note that when "INVITE" is received at step 2, the ATCF holds information (for example, an identifier of P-GW or an IP address) relating to the transmission destination of the voice communication data signal before switching.

This information may be held in association with an identifier of a mobile station such as STN-SR or C-MSISDN. Also, the information may be held in the MSC server/CS-MGW and notified to the ATCF at step S3022. Or the information may be held in the ATGW at step 3.

When "Configure ATGW" of a path switching signal is received, the ATGW switches a transmission destination of the voice communication data signal addressed from the UE#2 to the UE#1 from the MSC server/CS-MGW to the S/P-GW, and at step 3024, transmits "Configure ATGW Ack" to the ATCF.

Note that the transmission destination information (for example, an identifier of P-GW or an IP address) of the voice communication data signal may be notified at step S3023 or may be based on the information held in the ATGW.

At step S3025, the ATCF transmits a path completion notification signal to the MSC server/CS-MGW.

In the mobile communication system according to the present embodiment, the MSC server/CS-MGW is configured to return the transmission destination of the voice communication data signal addressed from the UE#2 to the UE#1 from the MSC server/CS-MGW to the S/P-GW if the MSC server/CS-MGW detects that the handover of the UE#1 from the E-UTRAN to the UTRAN/GERAN is completed before a predetermined period of time expires after transmission of since "Initiation of Session Transfer (that is, "INVITE")". Thus, even if an event causing the UE#1 to stay in the E-UTRAN occurs, such as, in a case where the UE#1 fails to receive a handover instruction signal, or if the E-UTRAN does not transmit "HO from EUTRAN command (a handover instruction signal)" in consideration of radio conditions and the like, an event where the UE#1 is disabled to perform communications can be avoided.

(Modification 1)

Hereinafter, a mobile communication system according to Modification 1 of the third embodiment is described by paying an attention to differences with the above-described mobile communication system according to the third embodiment.

In a mobile communication system according to Modification 1, in place of an MSC server/CS-MGW, an MSC is configured to transmit "Establish circuit" to the MSC server/CS-MGW and activate a timer.

Then, the MSC is configured to transmit a timer expiration signal to the MSC server/CS-MGW if the MSC does not detect that handover of UE#1 from E-UTRAN to UTRAN/GERAN is completed before the timer expires.

Here, the MSC server/CS-MGW is configured to transmit a path restoration instruction signal to an ATCF in response to the timer expiration signal.

On the other hand, the MSC stops the timer if the MSC does not detect that the handover of the UE#1 from the E-UTRAN to the UTRAN/GETAN is completed before the timer expires.

(Modification 2)

Hereinafter, a mobile communication system according to Modification 2 of the third embodiment is described by paying an attention to differences with the above-described mobile communication system according to the third embodiment.

In a mobile communication system according to Modification 2, in place of an MSC server/CS-MGW, a RNC is configured to transmit "Reloc/HO Req Ack" to an MSC and activate a timer.

Here, the RNC is configured to transmit a timer expiration signal to the MSC server/CS-MGW via the MSC if the RNC does not detect that handover of UE#1 from E-UTRAN to UTRAN/GERAN is completed before the timer expires.

Note that the MSC server/CS-MGW is configured to transmit a path restoration instruction signal to an ATCF in response to the timer expiration signal.

(Modification 3)

Hereinafter, referring to FIG. 11, a mobile communication system according to Modification 3 of the above-described third embodiment is described by paying an attention to differences with the above-described mobile communication system according to the third embodiment.

In a mobile communication system according Modification 3, an MSC server/CS-MGW is configured to, instead of performing timer control, transmit a path restoration instruction signal when the MSC server/CS-MGW detects that handover of the UE#1 from the E-UTRAN to the UTRAN/GERAN is interrupted.

For example, the MSC server/CS-MGW may detect the handover interruption by detecting release processing to be activated by a RNC or MSC.

Also, the MSC server/CS-MGW may be configured to detect that the handover of the UE#1 from the E-UTRAN to the UTRAN/GERAN is interrupted when a handover cancellation signal transmitted by the MME is received.

Figure 11:
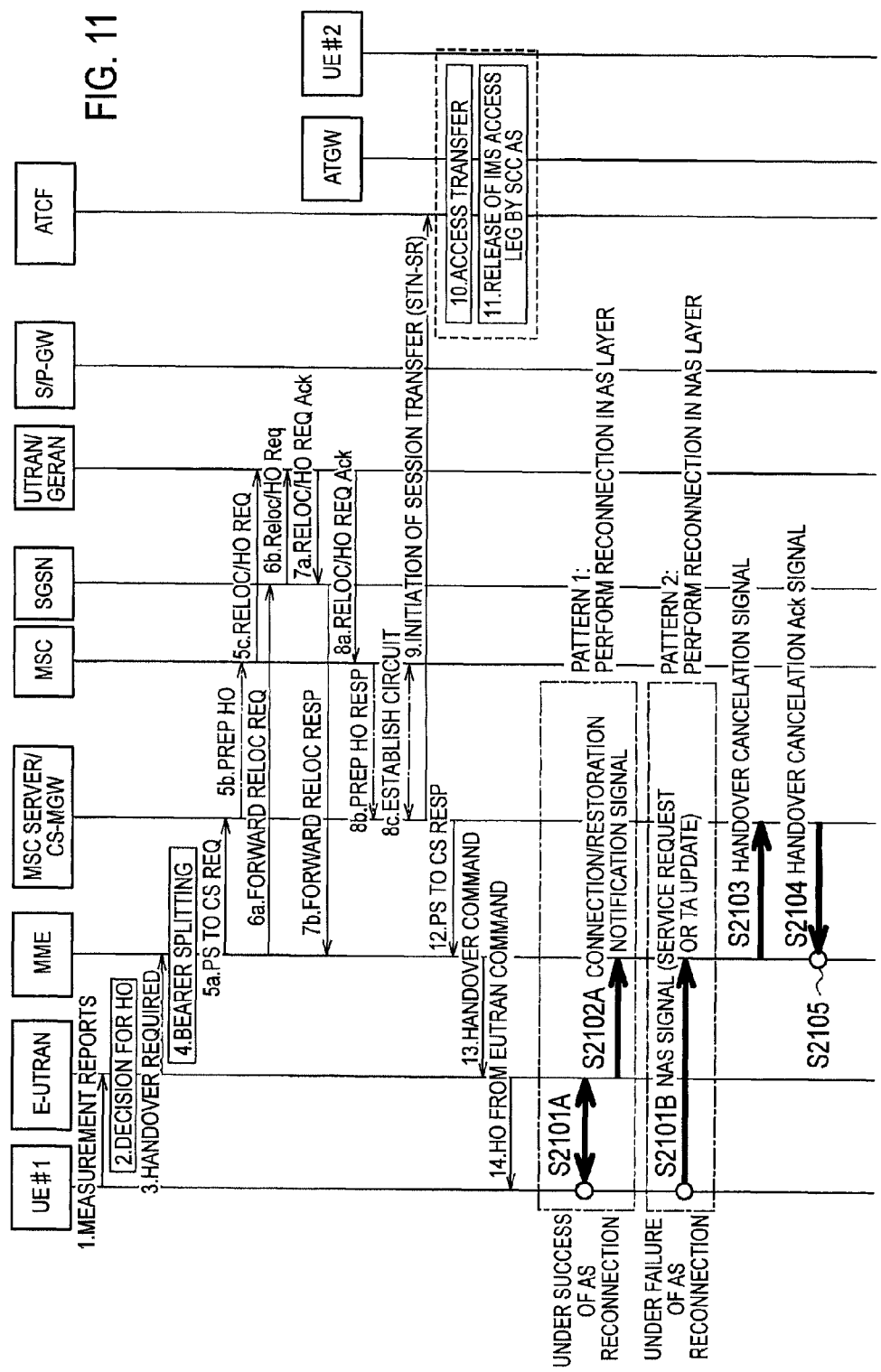
FIG. 11 is a sequence diagram illustrating an operation of a radio communication system according to Modification 3 of the third embodiment of the present invention.

Specifically, as shown in FIG. 11, after the UE#1 fails to receive "HO from E-UTRAN command" transmitted by the E-UTRAN at step 14, or after "HO from EUTRAN command" is received but the switching to the path via the GERAN/UTRAN is failed, the E-UTRAN transmits a connection/restoration notification signal to the MME at step S2102A when reconnection in an AS layer for the E-UTRAN succeeds at step S2101A.

On the other hand, as shown in FIG. 11, after the UE#1 fails to receive "HO from EUTRAN command" transmitted by the E-UTRAN at step 14 or after "HO EUTRAN command" is received but switching to the path via the GERAN/UTRAN is failed, if the reconnection in the AS layer for the E-UTRAN is failed, the UE#1 transmits an NAS signal such as "Service Request" or "TA Update" to the MME, that is, performs reconnection in the NAS layer with the MME at step S2101B.

When the connection/restoration notification signal or the NAS signal is received, the MME transmits a handover cancellation signal ("PS to CS Cancel Notification") to the MSC server/CS-MGW at step S2103.

Figure 10:
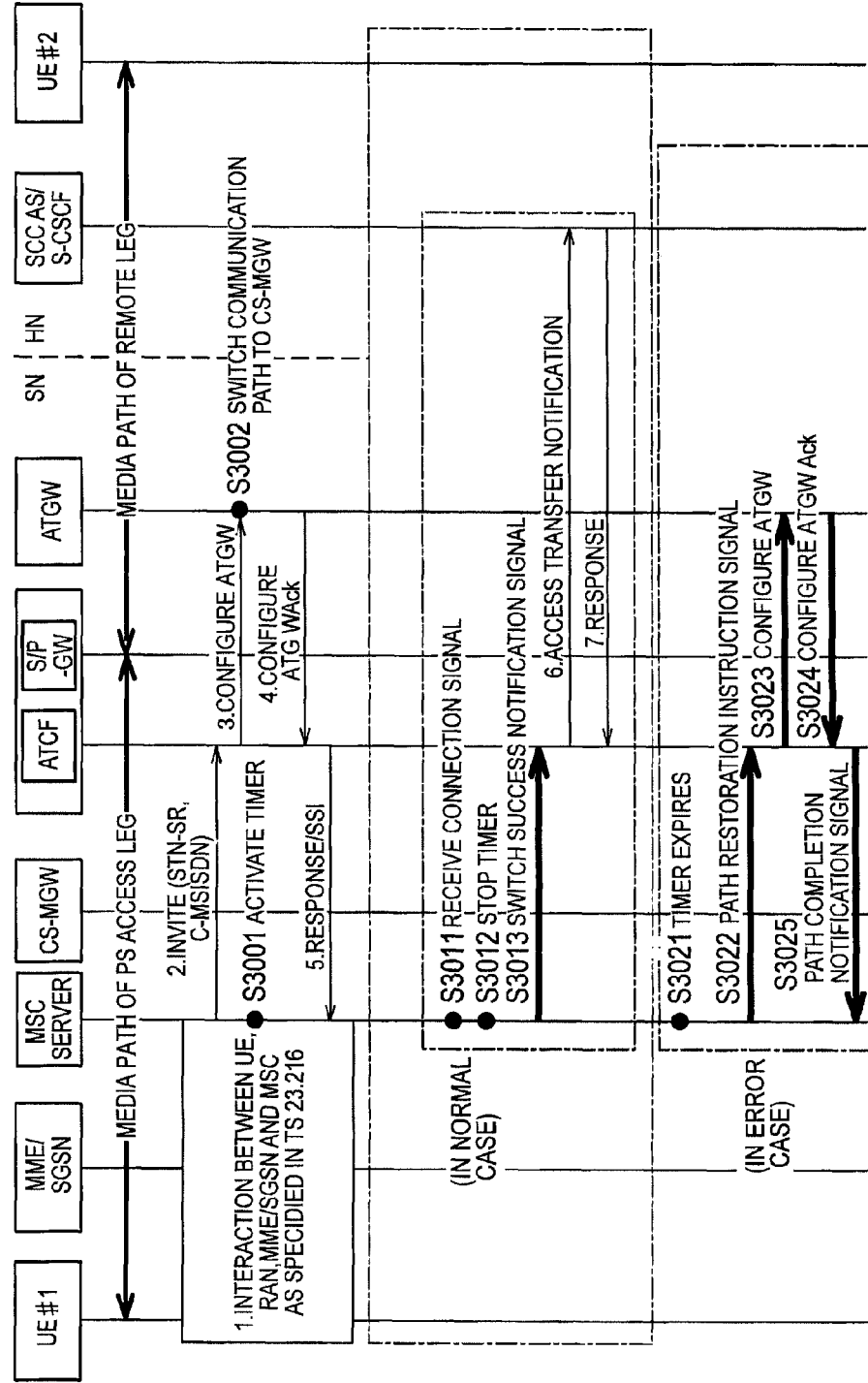
FIG. 10 is a sequence diagram illustrating an operation of a radio communication system according to a third embodiment of the present invention.

When the MSC server/CS-MGW receives the handover cancellation signal, the operation from step S3022 to S3025 in FIG. 10 is performed.

In addition, when the handover cancellation signal is received, the MSC server/CS-MGW transmits a handover cancellation Ack signal ("PS to CS Cancel Notification Ack") to the MME at step S2104.

When the handover cancellation Ack signal is received, the MME transmits "Session Reestablishment trigger notification" to the UE#1.

Here, if the handover cancellation Ack signal is received, the MME may determine whether "Session Reestablishment trigger notification" is transmitted to the UE#1 at step S2105, based on UE capability (for example, whether "Session Reestablishment trigger notification" is supported), whether the SRVCC enhancement scheme is implemented, "Cause value" contained in the handover cancellation Ack signal, a reason why the MME detected the reconnection (for example, reconnection in AS layer or reconnection in NAS layer), or the handover state received from the MME in connection before the reconnection.

Fourth Embodiment of the Invention

By referring to FIGS. 12 and 13, a mobile communication system according to a fourth embodiment of the present invention is described below by paying attention to differences with the mobile communication system according to the above-described second embodiment.

Figure 12:
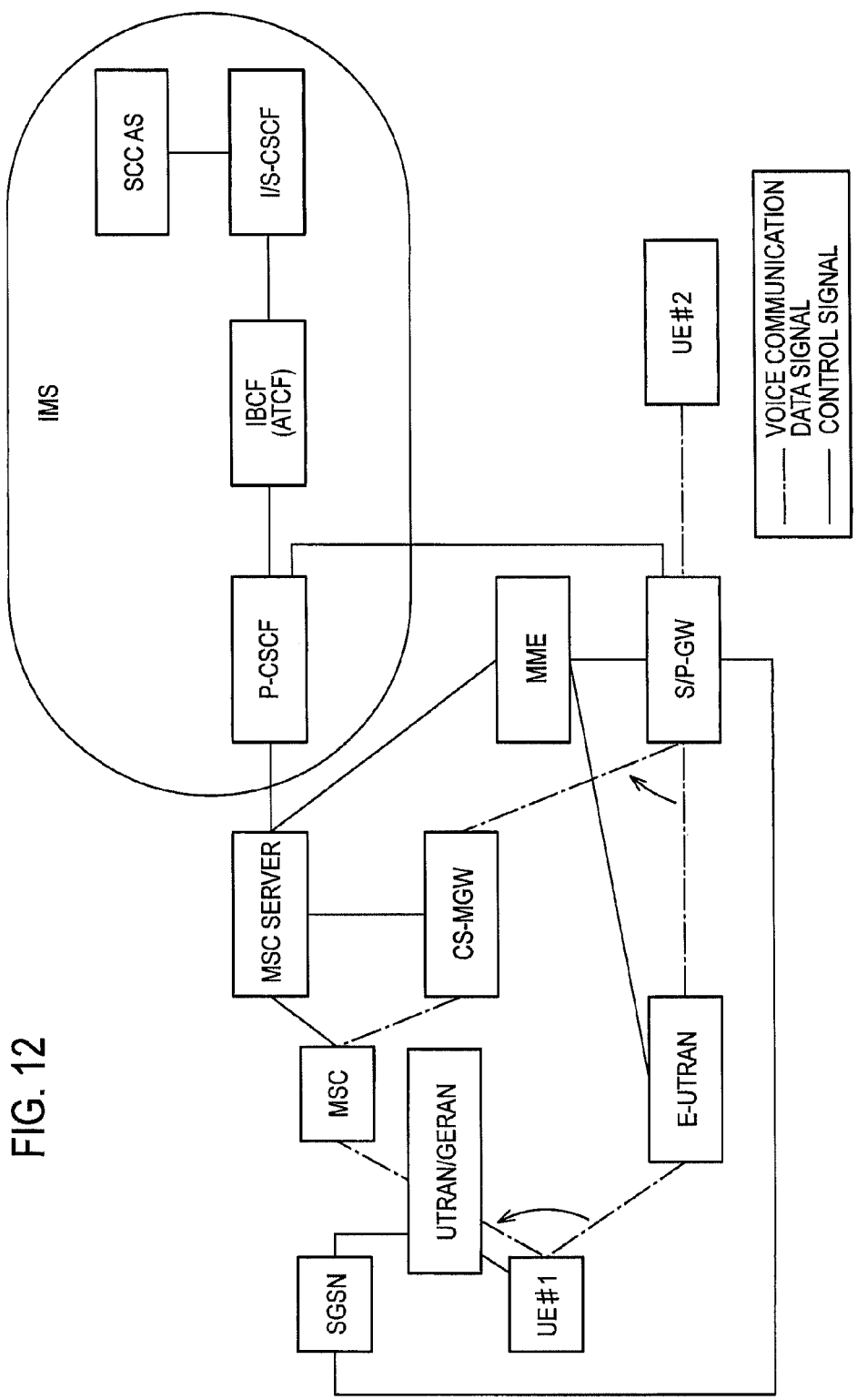
FIG. 12 is a configuration diagram of an overall mobile communication system according to a fourth embodiment of the present invention.

As shown in FIG. 12, a mobile communication system according to the present embodiment includes an IBCF (Interconnection Border Control Function) and an ATCF in addition to the configuration shown in FIG. 1. Note that the mobile communication system according to the present embodiment does not necessarily include the IBCF and ATCF.

In the mobile communication system according to the present embodiment, a path for voice communications between UE#1 and UE#2 can be switched using the SRVCC enhancement scheme, which is specified in Alt. 10 or Alt. 12 of the 3GPP TR23.856 v0.4.1 from a path (a path for IMS VoIP communications) via E-UTRAN or UTRAN to a path (a path for circuit switch communications) via UTRAN/GERAN.

Figure 13:
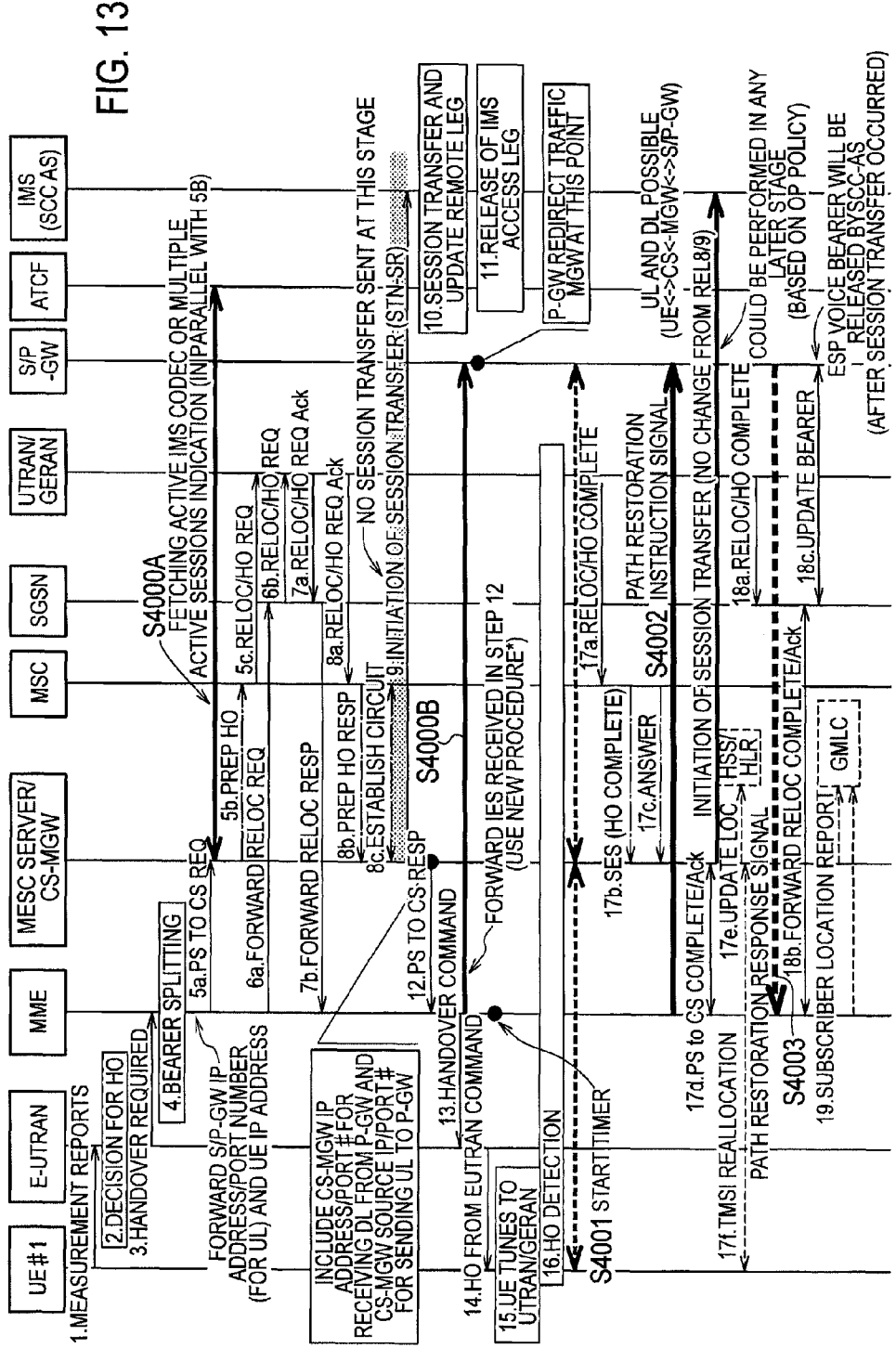
FIG. 13 is a sequence diagram illustrating an operation of the radio communication system according to the fourth embodiment of the present invention.
Figure 14:
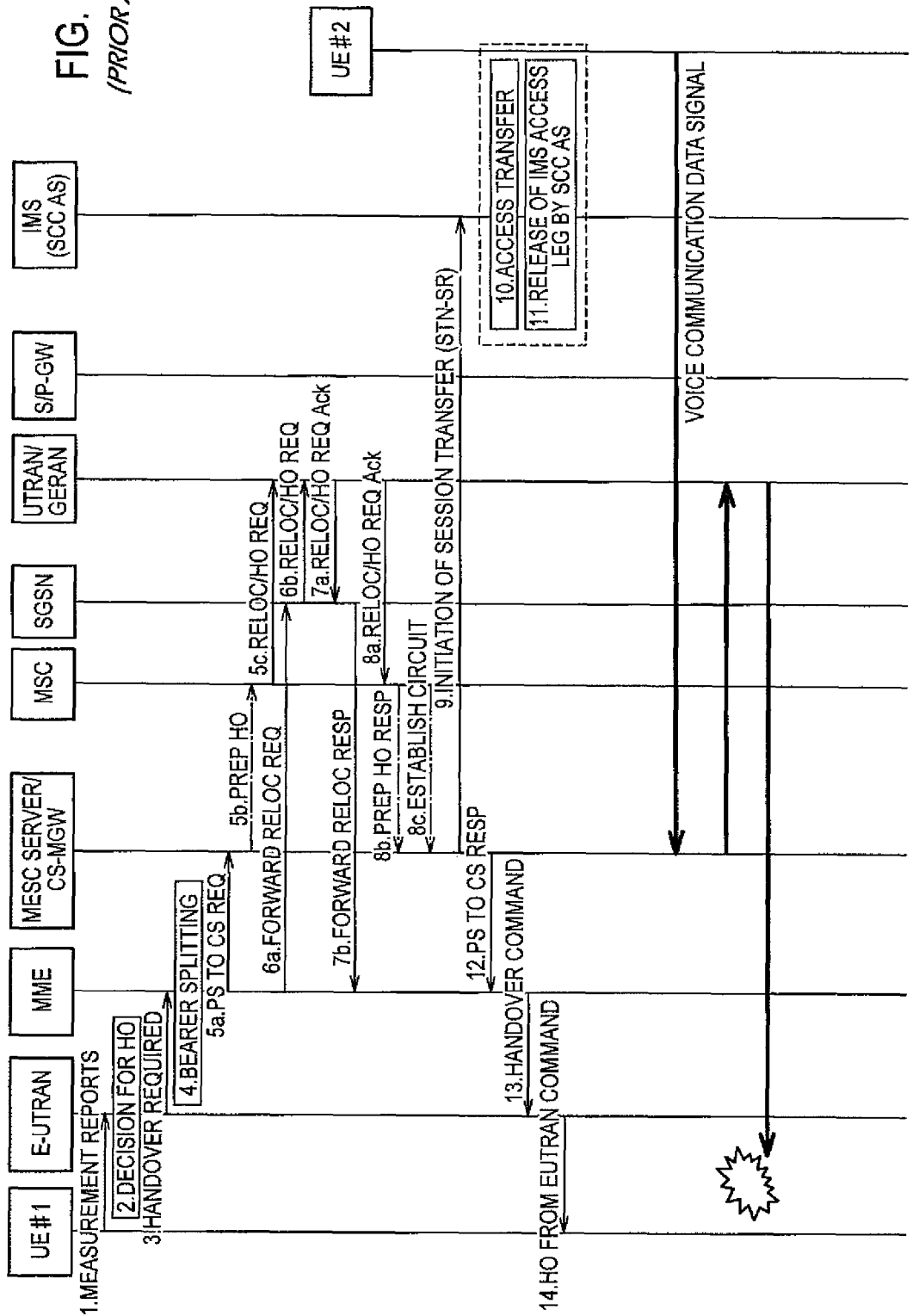
FIG. 14 is a sequence diagram illustrating an operation of a conventional mobile communication system.
Figure 15:
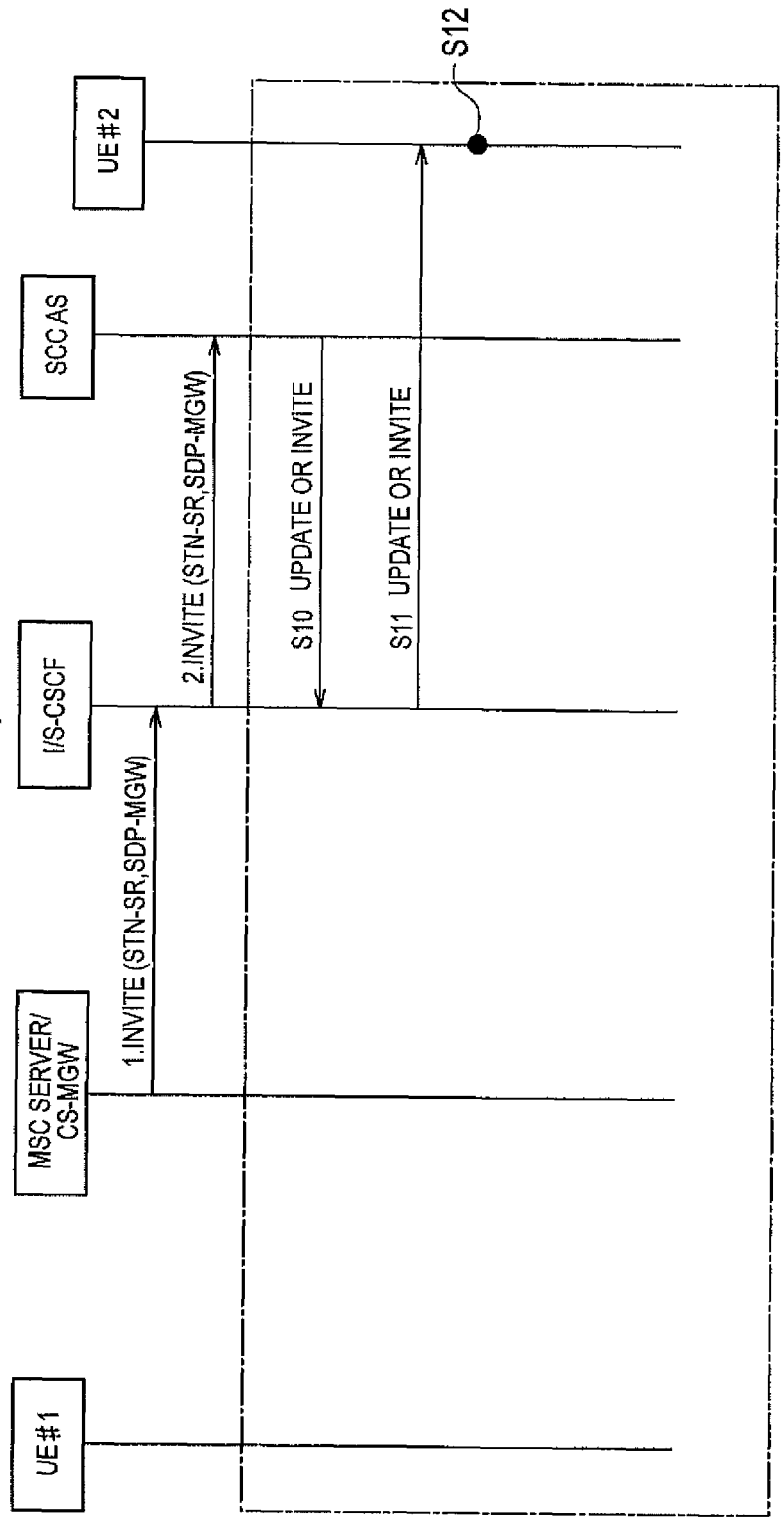
FIG. 15 is a sequence diagram illustrating an operation of a conventional mobile communication system.
Figure 16:
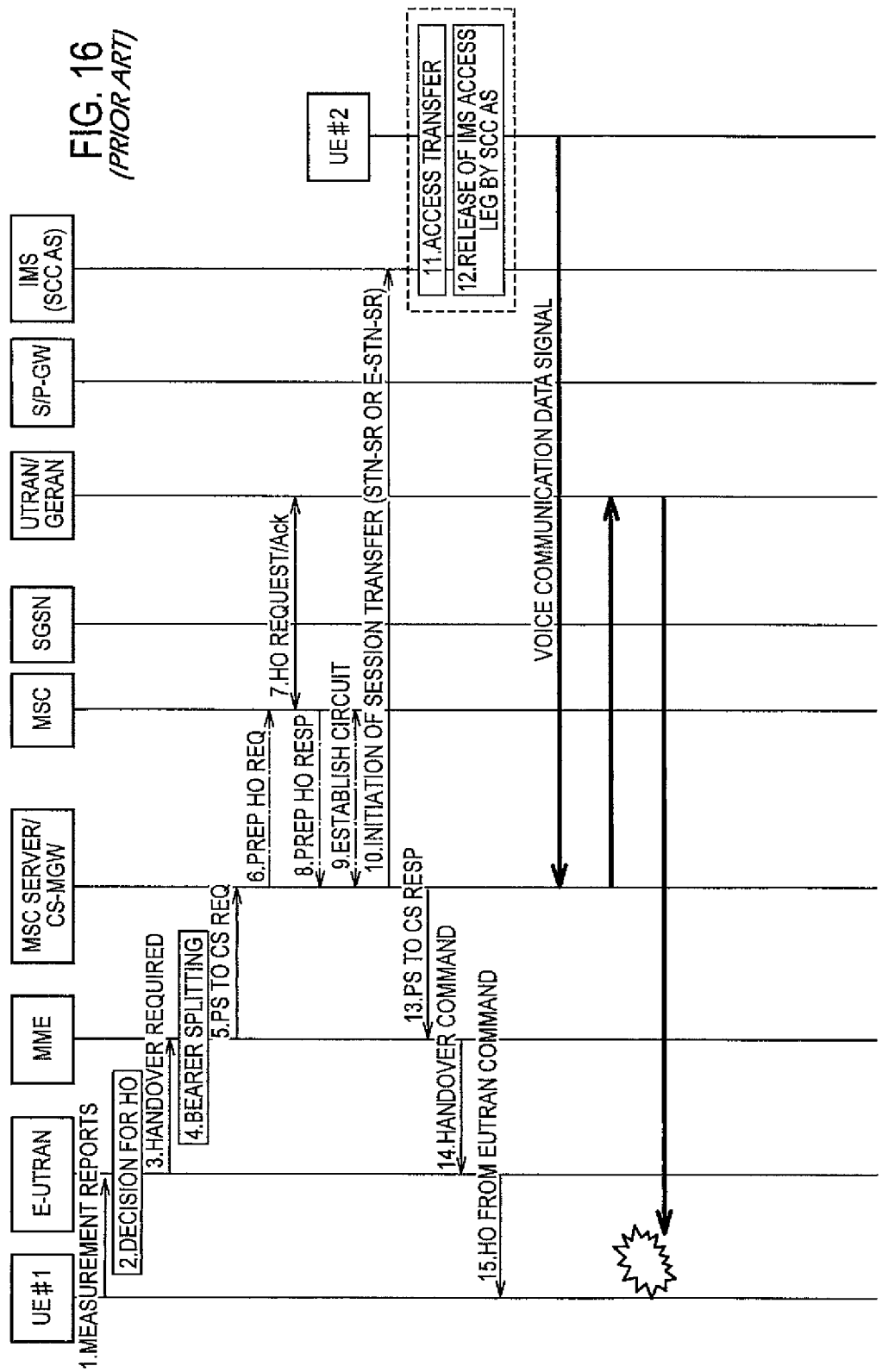
FIG. 16 is a sequence diagram illustrating an operation of a conventional mobile communication system.
Figure 17:
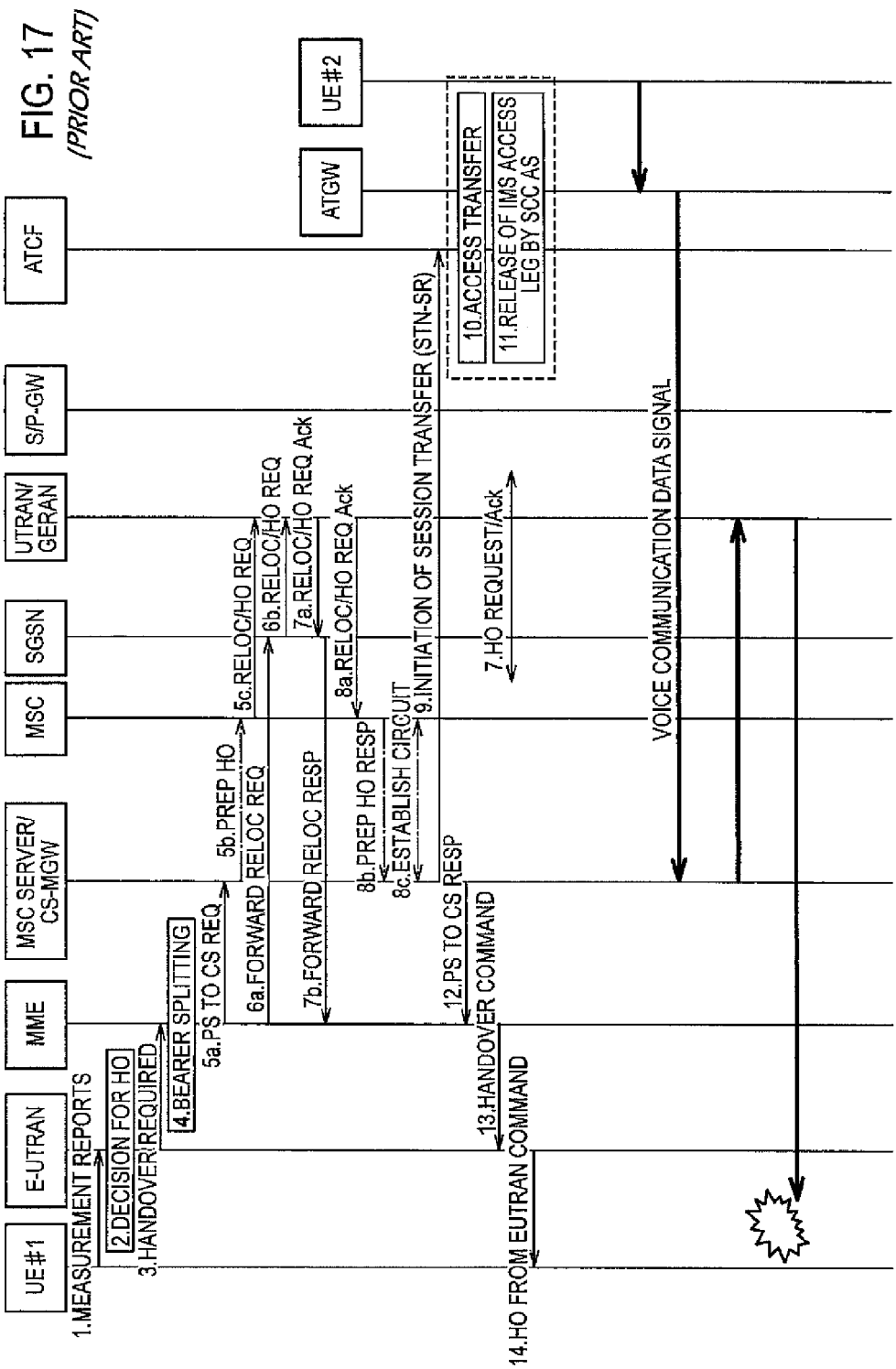
FIG. 17 is a sequence diagram illustrating an operation of a conventional mobile communication system.
Figure 18:
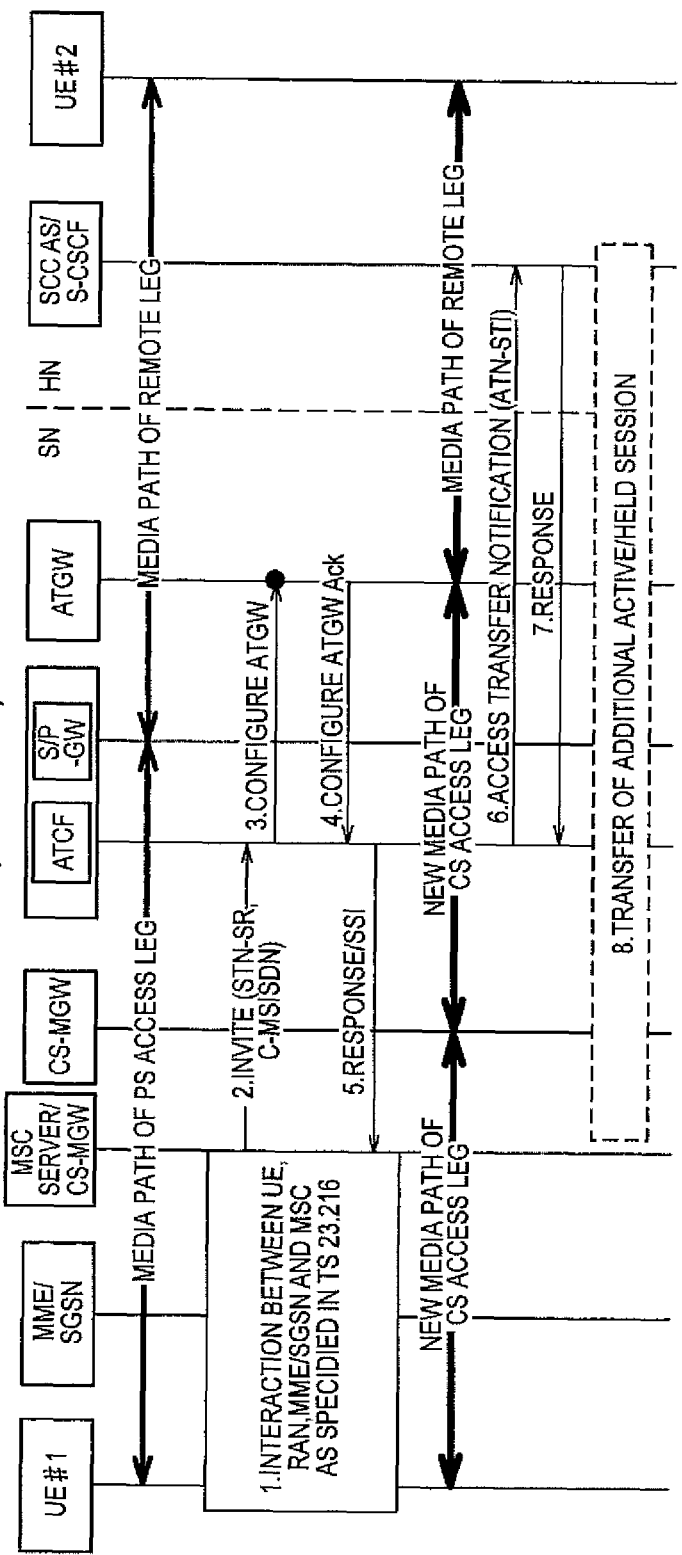
FIG. 18 is a sequence diagram illustrating an operation of a conventional mobile communication system.
Figure 19:
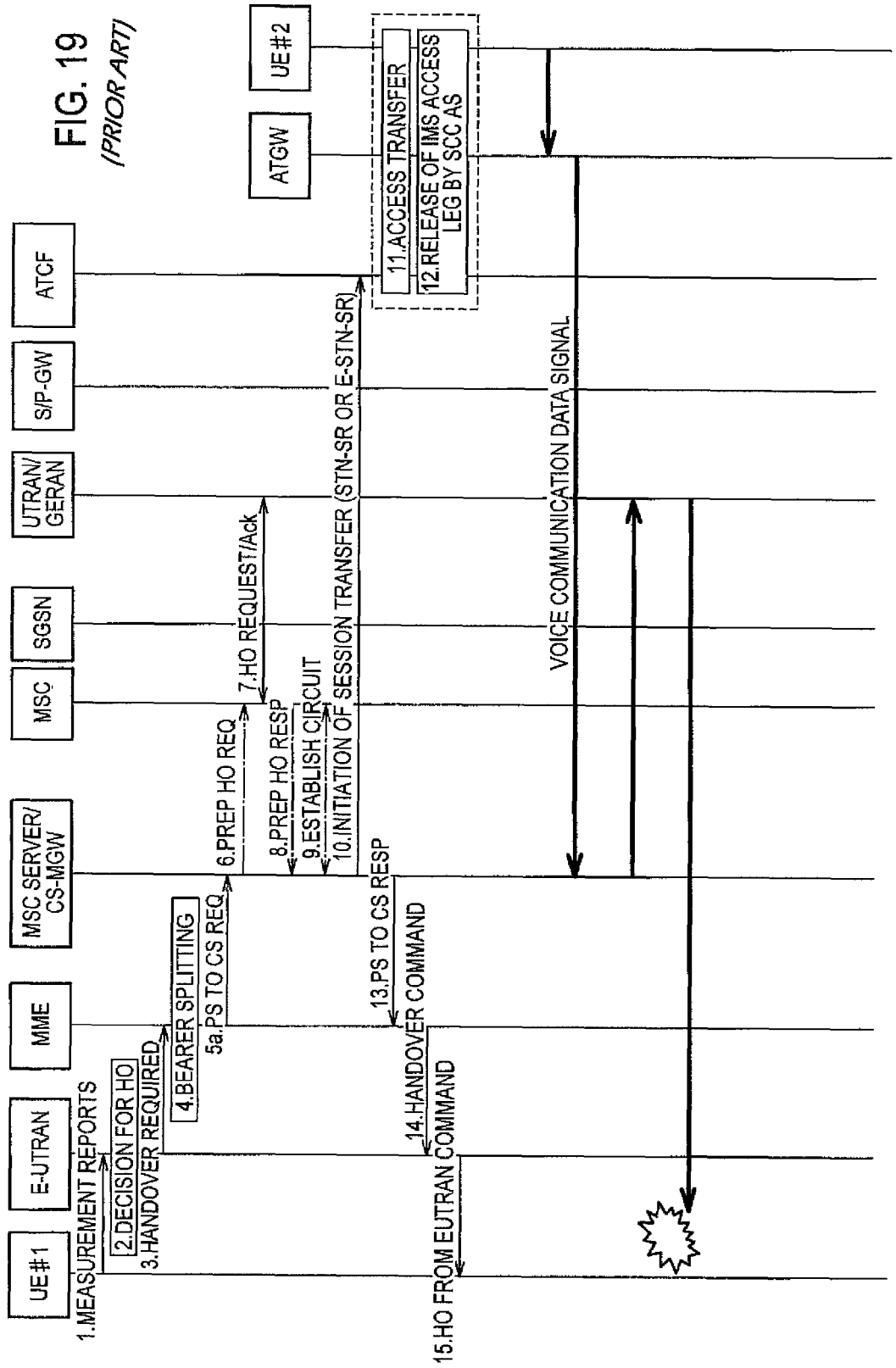
FIG. 19 is a sequence diagram illustrating an operation of a conventional mobile communication system.

As shown in FIG. 13, the MME transmits a path switching signal to the S/P-GW at step S4000B and activates a timer at step S4001.

Here, the S/P-GW is configured to switch a transmission destination of a voice communication data signal addressed from the UE#2 to the UE#1 from the S/P-GW to the MSC server/CS-MGW based on the path switching signal.

Note that the MME is configured to stop the timer if the MME detects that handover of the UE#1 from the E-UTRAN to the UTRAN/GERAN is completed before the timer expires, that is, if "SES (HO Complete)" or "ANSWER" is received from the MSC.

On the other hand, the MME is configured to transmit a path restoration instruction signal to the S/P-GW if the MME detects that the handover of the UE#1 from the E-UTRAN to the UTRAN/GERAN is completed before the timer expires, that is, if "SES (HO Complete)" or "ANSWER" is not received from the MSC.

The path restoration instruction signal may be configured of mobile station identification information of the UE#1, voice bearer information before the switching, or the like. Or, the voice bearer information before the switching may be held in the P-GW.

Here, the S/P-GW is configured to switch a transmission destination of the voice communication data signal addressed from the UE#2 to the UE#1 from the MSC server/CS-MGW to the S/P-GW based on the path restoration instruction signal.

In the mobile communication system according to the present embodiment, the S/P-GW is configured to return the transmission destination of the voice communication data signal addressed from the UE#2 to the UE#1 from the MSC server/CS-MGW to the S/P-GW if the S/P-GW does not detect that the handover of the UE#1 from the E-UTRAN to the UTRAN/GERAN is completed before a predetermined period of time expires after transmission of the path switching signal from the MME. Thus, even if an event causing the UE#1 to stay in the E-UTRAN occurs, such as, in a case where the UE#1 fails to receive a handover instruction signal, or if the E-UTRAN does not transmit "HO from EUTRAN command (a handover instruction signal)" in consideration of radio conditions and the like, an event where the UE#1 is disabled to perform communications can be avoided.

The characteristics of the above-described embodiments may be also expressed as follows.

A first characteristic of the present embodiment is a mobile communication method of switching a path for a voice communication data signal between UE#1 (a first mobile station) and UE#2 (a second mobile station) from a path via E-UTRAN (a first radio access network not supporting a circuit switch communication) to a path via UTRAN/GERAN (a second radio access network supporting a circuit switch communication), the mobile communication method comprising the steps where: an MSC server/CS-MGW (a predetermined server) for the UTRAN/GERAN transmits a path switching signal and activates a timer; the UE#2 switches a transmission destination of the voice communication data signal addressed to the UE#1 from an S/P-GW (a gateway apparatus) connected with the E-UTRAN to the MSC server/CS-MGW; the MSC server/CS-MGW transmits a path restoration instruction signal if not detecting that handover of the UE#1 from the E-UTRAN to the UTRAN/GETAN is completed before the timer expires; and the UE#2 switches a transmission destination of the voice communication data signal addressed to the UE#1 from the MSC server/CS-MGW to the S/P-GW in response to the path restoration instruction signal.

A second characteristic of the present embodiment is a mobile communication method of switching a path for a voice communication data signal between UE#1 and UE#2 from a path via E-UTRAN to a path via UTRAN/GERAN, the mobile communication method comprising the steps where: an MSC connected with the UTRAN/GERAN transmits "Establish circuit (a circuit establishing signal)" and activates a timer; an MSC server/CS-MGW transmits a path switching signal in response to "Establish circuit"; the UE#2 switches a transmission destination of the voice communication data signal addressed to the UE#1 from an S/P-GW to the MSC server/CS-MGW; the MSC transmits a timer expiration signal if not detecting that handover of the UE#1 from the E-UTRAN to the UTRAN/GETAN is completed before the timer expires; the MSC server/CS-MGW transmits a path restoration instruction signal in response to the timer expiration signal; and the UE#2 switches a transmission destination of the voice communication data signal addressed to the UE#1 from the MSC server/CS-MGW to the S/P-GW in response to the path restoration instruction signal.

A third characteristic of the present embodiment is a mobile communication method of switching a path for a voice communication data signal between UE#1 and UE#2 from a path via E-UTRAN to a path via UTRAN/GERAN, the mobile communication method comprising the steps where: a RNC (a controller) in the UTRAN/GERAN transmits "Reloc/HOReqAck (a handover preparation completion signal)" and activates a timer; the MSC transmits "Establish circuit" after having received "Reloc/HO Req Ack"; an MSC server/CS-MGW transmits a path switching signal in response to "Establish circuit"; the UE#2 switches a transmission destination of the voice communication data signal addressed to the UE#1 from the S/P-GW to the MSC server/CS-MGW; the RNC transmits a timer expiration signal if not detecting that handover of the UE#1 from the E-UTRAN to the UTRAN/GETAN is completed before the timer expires; the MSC server/CS-MGW transmits a path restoration instruction signal in response to the timer expiration signal; and the UE#2 switches a transmission destination of the voice communication data signal addressed to the UE#1 from the MSC server/CS-MGW to the S/P-GW in response to the path restoration instruction signal.

A fourth characteristic of the present embodiment is a mobile communication method of switching a path for a voice communication data signal between UE#1 and UE#2 from a path via E-UTRAN to a path via UTRAN/GERAN, the mobile communication method comprising the steps where: an MSC server/CS-MGW transmits a path switching signal; the UE#2 switches a transmission destination of the voice communication data signal addressed to the UE#1 from an S/P-GW to the MSC server/CS-MGW; the MSC server/CS-MGW transmits a path restoration instruction signal if not detecting that handover of the UE#1 from the E-UTRAN to the UTRAN/GETAN is interrupted; and the UE#2 switches a transmission destination of the voice communication data signal addressed to the UE#1 from the MSC server/CS-MGW to the S/P-GW in response to the path restoration instruction signal.

A fifth characteristic of the present embodiment is a mobile communication method of switching a path for a voice communication data signal between UE#1 and UE#2 from a path via E-UTRAN to a path via UTRAN/GERAN, the mobile communication method comprising the steps where: an MSC server/CS-MGW transmits a path switching signal; an ATGW (a path switching apparatus) switches a transmission destination of the voice communication data signal addressed from the UE#2 to the UE#1 from an S/P-GW to the MSC server/CS-MGW based on the path switching signal and activates a timer; and the ATGW switches the transmission destination of the voice communication data signal addressed from the UE#2 to the UE#1 from the S/P-GW to the MSC server/CS-MGW if not detecting that switching of the path for a voice communication data signal from the path via the E-UTRAN to the path via UTRAN/GERAN is completed before the timer expires.

A sixth characteristic of the present embodiment is a mobile communication method of switching a path for a voice communication data signal between UE#1 and UE#2 from a path via E-UTRAN to a path via UTRAN/GERAN, the mobile communication method comprising the steps where: an MSC server/CS-MGW transmits a path switching signal and activates a timer; an ATGW switches a transmission destination of the voice communication data signal addressed from the UE#2 to the UE#1 from an S/P-GW to the MSC server/CS-MGW based on the path switching signal; the MSC server/CS-MGW transmits a path restoration instruction signal if not detecting that handover of the UE#1 from the E-UTRAN to the UTRAN/GETAN is completed before the timer expires; and the ATGW switches a transmission destination of the voice communication data signal addressed from the UE#2 to the UE#1 from the MSC server/CS-MGW to the S/P-GW in response to the path restoration instruction signal.

A seventh characteristic of the present embodiment is a mobile communication method of switching a path for a voice communication data signal between UE#1 and UE#2 from a path via E-UTRAN to a path via UTRAN/GERAN, the mobile communication method comprising the steps where: an MSC transmits "Establish circuit" and activates a timer; an MSC server/CS-MGW transmits a path switching signal in response to "Establish circuit"; an ATGW switches a transmission destination of the voice communication data signal addressed from the UE#2 to the UE#1 from an S/P-GW to the MSC server/CS-MGW based on the path switching signal; the MSC transmits a path restoration instruction signal if not detecting that handover of the UE#1 from the E-UTRAN to the UTRAN/GETAN is completed before the timer expires; and the ATGW switches a transmission destination of the voice communication data signal addressed from the UE#2 to the UE#1 from the MSC server/CS-MGW to the S/P-GW in response to the path restoration instruction signal.

An eighth characteristic of the present embodiment is a mobile communication method of switching a path for a voice communication data signal between UE#1 and UE#2 from a path via E-UTRAN to a path via UTRAN/GERAN, the mobile communication method comprising the steps where: a RNC transmits "Reloc/HO Req Ack" and activates a timer; an MSC transmits "Establish circuit" after having received "Reloc/HO Req Ack"; an MSC server/CS-MGW transmits a path switching signal in response to "Establish circuit"; an ATGW switches a transmission destination of the voice communication data signal addressed from the UE#2 to the UE#1 from an S/P-GW to the MSC server/CS-MGW based on the path switching signal; the RNC transmits a path restoration instruction signal if not detecting that handover of the UE#1 from the E-UTRAN to the UTRAN/GETAN is completed before the timer expires; and the ATGW switches a transmission destination of the voice communication data signal addressed from the UE#2 to the UE#1 from the MSC server/CS-MGW to the S/P-GW in response to the path restoration instruction signal.

A ninth characteristic of the present embodiment is a mobile communication method of switching a path for a voice communication data signal between UE#1 and UE#2 from a path via E-UTRAN to a path via UTRAN/GERAN, the mobile communication method comprising the steps where: an MSC server/CS-MGW transmits a path switching signal; an ATGW switches a transmission destination of the voice communication data signal addressed from the UE#2 to the UE#1 from an S/P-GW to the MSC server/CS-MGW based on the path switching signal; the MSC server/CS-MGW transmits a path restoration instruction signal if not detecting that handover of the UE#1 from the E-UTRAN to the UTRAN/GETAN is interrupted; and the ATGW switches a transmission destination of the voice communication data signal addressed from the UE#2 to the UE#1 from the MSC server/CS-MGW to the S/P-GW in response to the path restoration instruction signal.

A tenth characteristic of the present embodiment is a mobile communication method of switching a path for a voice communication data signal between UE#1 and UE#2 from a path via E-UTRAN to a path via UTRAN/GERAN, the mobile communication method comprising the steps where: an MME (mobility management node) connected with the E-UTRAN transmits a path switching signal and activates a timer; an S/P-GW switches a transmission destination of the voice communication data signal addressed from the UE#2 to the UE#1 from the S/P-GW to the MSC server/CS-MGW based on the path switching signal; the MME transmits a path restoration instruction signal if not detecting that handover of the UE#1 from the E-UTRAN to the UTRAN/GETAN is completed before the timer expires; and the S/P-GW switches a transmission destination of the voice communication data signal addressed from the UE#2 to the UE#1 from the MSC server/CS-MGW to the S/P-GW in response to the path restoration instruction signal.

Heretofore, the present invention is described in detail using the above-described embodiments. However, it is apparent for those skilled in the art that the present invention is not limited to the embodiments described herein. The present invention can be implemented as amended and modified embodiments without departing from the scope and spirit thereof, which is defined by the description of the scope of claims. Accordingly, the description herein only intends an illustration and does not mean any limitation to the invention.

DESCRIPTION OF THE REFERENCE NUMERALS

UE#1, UE#2 . . . mobile station
MME . . . mobility management node
SGSN . . . packet switch
MSC . . . circuit switch
S/P-GW . . . gateway apparatus
RNC . . . controller
E-UTRAN, U-TRAN/GERAN . . . radio access network

The invention claimed is:

1. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:
  causing a predetermined server for the second radio access network to transmit a path switching signal and activate a timer;
  causing the second mobile station to switch a transmission destination of the voice communication data signal addressed to the first mobile station from a gateway apparatus connected with the first radio access network to the predetermined server based on the path switching signal;
  causing the predetermined server to transmit a path restoration instruction signal instructing return from the path via a second access network to the path via a first radio access network to the second mobile station if not detecting that handover of the first mobile station from the first radio access network to the second radio access network is completed before the timer expires; and
  causing the second mobile station to switch the transmission destination of the voice communication data signal addressed to the first mobile station from the predetermined server to the gateway apparatus in response to the path restoration instruction signal.

2. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:
  causing a circuit switch connected with the second radio access network to transmit a circuit establishing signal and activate a timer;
  causing a predetermined server for the second radio access network to transmit a path switching signal in response to the circuit establishing signal;
  causing the second mobile station to switch a transmission destination of the voice communication data signal addressed to the first mobile station from a gateway apparatus connected with the first radio access network to the predetermined server based on the path switching signal;
  causing the circuit switch to transmit a timer expiration signal if not detecting that handover of the first mobile station from the first radio access network to the second radio access network is completed before the timer expires;
  causing the predetermined server to transmit a path restoration instruction signal instructing return from the path via a second access network to the path via a first radio access network to the second mobile station in response to the timer expiration signal; and
  causing the second mobile station to switch the transmission destination of the voice communication data signal addressed to the first mobile station from the predetermined server to the gateway apparatus in response to the path restoration instruction signal.

3. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps:
  causing a controller in the second radio access network to transmit a handover preparation completion signal and activate a timer;
  causing a circuit switch connected with the second radio access network to transmit a circuit establishing signal after having received the handover preparation completion signal;
  causing a predetermined server for the second radio access network to transmit a path switching signal in response to the circuit establishing signal;
  causing the second mobile station to switch a transmission destination of the voice communication data signal addressed to the first mobile station from a gateway apparatus connected with the first radio access network to the predetermined server based on the path switching signal;
  causing the controller to transmit a timer expiration signal if not detecting that handover of the first mobile station from the first radio access network to the second radio access network is completed before the timer expires;
  causing the predetermined server to transmit a path restoration instruction signal instructing return from the path via a second access network to the path via a first radio access network to the second mobile station in response to the timer expiration signal; and
  causing the second mobile station to switch the transmission destination of the voice communication data signal addressed to the first mobile station from the predetermined server to the gateway apparatus in response to the path restoration instruction signal.

4. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:
  causing a predetermined server for the second radio access network to transmit a path switching signal;
  causing the second mobile station to switch a transmission destination of the voice communication data signal addressed to the first mobile station from a gateway apparatus connected with the first radio access network to the predetermined server based on the path switching signal;
  causing the predetermined server to transmit a path restoration instruction signal instructing return from the path via a second access network to the path via a first radio access network to the second mobile station if detecting that handover of the first mobile station from the first radio access network to the second radio access network is interrupted; and
  causing the second mobile station to switch the transmission destination of the voice communication data signal addressed to the first mobile station from the predetermined server to the gateway apparatus in response to the path restoration instruction signal.

5. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:
  causing a predetermined server for the second radio access network to transmit a path switching signal;
  causing a path switching apparatus to switch a transmission destination of the voice communication data signal addressed from the second mobile station to the first mobile station from a gateway apparatus connected with the first radio access network to the predetermined server based on the path switching signal, and to activate a timer; and
  causing the path switching apparatus to switch the transmission destination of the voice communication data signal addressed from the second mobile station to the first mobile station from the gate way apparatus to the predetermined server by transmitting a path restoration instruction signal instructing return from the path via a second access network to the path via a first radio access network to the second mobile station if not detecting that switching of the path for the voice communication data signal from the path via the first radio access network to a path via the second radio access network is completed before the timer expires.

6. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:
  causing a predetermined server for the second radio access network to transmit a path switching signal and activate a timer;
  causing a path switching apparatus to switch a transmission destination of the voice communication data signal addressed from the second mobile station to the first mobile station from a gateway apparatus connected with the first radio access network to the predetermined server based on the path switching signal;
  causing the predetermined server to transmit a path restoration instruction signal instructing return from the path via a second access network to the path via a first radio access network to the second mobile station if not detecting that handover of the first mobile station from the first radio access network to the second radio access network is completed before the timer expires; and
  causing the path switching apparatus to switch the transmission destination of the voice communication data signal addressed from the second mobile station to the first mobile station from the predetermined server to the gateway apparatus in response to the path restoration instruction signal.

7. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:
  causing a circuit switch connected with the second radio access network to transmit a circuit establishing signal and activate a timer;
  causing a predetermined server for the second radio access network to transmit a path switching signal in response to the circuit establishing signal;
  causing a path switching apparatus to switch a transmission destination of the voice communication data signal addressed from the second mobile station to the first mobile station from a gateway apparatus connected with the first radio access network to the predetermined server based on the path switching signal;
  causing the circuit switch to transmit a timer expiration signal if not detecting that handover of the first mobile station from the first radio access network to the second radio access network is completed before the timer expires;
  causing the predetermined server to transmit a path restoration instruction signal instructing return from the path via a second access network to the path via a first radio access network to the second mobile station in response to the timer expiration signal; and
  causing the path switching apparatus to switch the transmission destination of the voice communication data signal addressed from the second mobile station to the first mobile station from the predetermined server to the gateway apparatus in response to the path restoration instruction signal.

8. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:
  causing a controller in the second radio access network to transmit a handover preparation completion signal and activate a timer;
  causing a circuit switch connected with the second radio access network to transmit a circuit establishing signal after having received the handover preparation completion signal; causing a predetermined server for the second radio access network to transmit a path switching signal in response to the circuit establishing signal;

causing a path switching apparatus to switch a transmission destination of the voice communication data signal addressed from the second mobile station to the first mobile station from a gateway apparatus connected with the first radio access network to the predetermined server based on the path switching signal;

causing the controller to transmit a timer expiration signal if not detecting that handover of the first mobile station from the first radio access network to the second radio access network is completed before the timer expires;

causing the predetermined server to transmit a path restoration instruction signal instructing return from the path via a second access network to the path via a first radio access network to the second mobile station in response to the timer expiration signal; and causing the path switching apparatus to switch the transmission destination of the voice communication data signal addressed from the second mobile station to the first mobile station from the predetermined server to the gateway apparatus in response to the path restoration instruction signal.

9. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:

causing a predetermined server for the second radio access network to transmit a path switching signal;

causing a path switching apparatus to switch a transmission destination of the voice communication data signal addressed from the second mobile station to the first mobile station from a gateway apparatus connected with the first radio access network to the predetermined server based on the path switching signal;

causing the predetermined server to transmit a path restoration instruction signal instructing return from the path via a second access network to the path via a first radio access network to the second mobile station if detecting that handover of the first mobile station from the first radio access network to the second radio access network is interrupted; and causing the path switching apparatus to switch the transmission destination of the voice communication data signal addressed from the second mobile station to the first mobile station from the predetermined server to the gateway apparatus in response to the path restoration instruction signal.

10. A mobile communication method of switching a path for a voice communication data signal between a first mobile station and a second mobile station from a path via a first radio access network not supporting a circuit switch communication to a path via a second access network supporting a circuit switch communication, the mobile communication method comprising the steps of:

causing a mobility management node connected with the first radio access network to transmit a path switching signal and activate a timer;

causing a gateway apparatus connected with the first radio access network to switch a transmission destination of the voice communication data signal addressed from the second mobile station to the first mobile station from the first radio access network to the predetermined server based on the path switching signal;

causing the mobility management node to transmit a path restoration instruction signal instructing return from the path via a second access network to the path via a first radio access network to the second mobile station if not detecting that handover of the first mobile station from the first radio access network to the second radio access network is completed before the timer expires; and causing the gateway apparatus to switch the transmission destination of the voice communication data signal addressed from the second mobile station to the first mobile station from the predetermined server to the first radio access network in response to the path restoration instruction signal.

* * * * *